(12) United States Patent
Ushiro et al.

(10) Patent No.: US 7,780,530 B2
(45) Date of Patent: Aug. 24, 2010

(54) CHARACTER MANAGING SYSTEM, CHARACTER SERVER, CHARACTER MANAGING METHOD, AND PROGRAM

(75) Inventors: Teruyuki Ushiro, Chiba (JP); Hideki Oyaizu, Tokyo (JP); Yoshiaki Iwai, Tokyo (JP); Masaaki Oka, Tokyo (JP)

(73) Assignee: Sony Corporation, Tokyo (JP)

( * ) Notice: Subject to any disclaimer, the term of this patent is extended or adjusted under 35 U.S.C. 154(b) by 1281 days.

(21) Appl. No.: 10/165,131

(22) Filed: Jun. 6, 2002

(65) Prior Publication Data

US 2003/0008713 A1 Jan. 9, 2003

(30) Foreign Application Priority Data

Jun. 7, 2001 (JP) ............................ P2001-172031

(51) Int. Cl.
*A63F 9/24* (2006.01)
(52) U.S. Cl. ............................................ 463/42; 463/1
(58) Field of Classification Search .................... 463/29, 463/40–43, 1; 709/219
See application file for complete search history.

(56) References Cited

U.S. PATENT DOCUMENTS 6,009,458 A * 12/1999 Hawkins et al. ............. 709/203
6,061,656 A * 5/2000 Pace ............................... 705/1
6,419,577 B1 * 7/2002 Okada et al. .................... 463/1
6,595,853 B1 * 7/2003 Osawa .......................... 463/20
6,607,444 B2 * 8/2003 Takahashi et al. ............. 463/42
6,699,125 B2 * 3/2004 Kirmse et al. ................. 463/42
6,746,333 B1 * 6/2004 Onda et al. .................... 463/43
6,755,743 B1 * 6/2004 Yamashita et al. ............ 463/42
6,805,634 B1 * 10/2004 Wells et al. ................... 463/42
6,941,353 B1 * 9/2005 Lane .......................... 709/219
7,056,217 B1 * 6/2006 Pelkey et al. .................. 463/43
2002/0068630 A1 * 6/2002 Dunlap ........................ 463/42

OTHER PUBLICATIONS

Delta Force 2. Nov. 3, 1999. [online] [retrieved on Apr. 13, 2006] <URL: http://public.planetmirror.com/pub/replacementdocs/Delta_Force_2_-_Manual_-_PC.pdf>.*

* cited by examiner

*Primary Examiner*—Peter DungBa Vo
*Assistant Examiner*—Omkar Deodhar
(74) *Attorney, Agent, or Firm*—K&L Gates LLP

(57) ABSTRACT

Characters set corresponding to users are registered in a character server, so the users can download characters from the character server and feature the characters in various games. Also, characters of different players can notify characters of players within a range permitted beforehand regarding their own locations in different games or different virtual spaces, and can send messages one to another. Further, in addition to the appearance of the character, attributes of the character and items which the player have can be stored in the character server, and used throughout various games. Thus, the same characters can be featured in various types of game programs.

54 Claims, 28 Drawing Sheets

FIG. 19

SCREEN 1

CONNECT TO CHARACTER SERVER

PLEASE INPUT ID AND PASSWORD

ID [ A ]
PASSWORD [ ]

⇩

SCREEN 2

STATUS OF BUDDY CHARACTERS

| NAME | GAME | STATUS | ACTION |
|---|---|---|---|
| KANE | NETWORK RACING GAME (C) | DRIVING SUZUKA CIRCUIT | TRANSMIT MESSAGE / PARTICIPATE IN GAME |
| LINDA | NETWORK RPG (A) | FIGHTING WITH MONSTER IN SO-AND-SO FOREST | TRANSMIT MESSAGE / PARTICIPATE IN GAME |
| TARO | NETWORK BASEBALL GAME (A) | IN TOP OF 8TH INNING AGAINST SO-AND-SO TEAM | TRANSMIT MESSAGE / PARTICIPATE IN GAME |
| HANAKO | — | — | — |

[NEXT PAGE]  [DISCLOSE INFORMATION]  [END]

CHARACTER MANAGING SYSTEM, CHARACTER SERVER, CHARACTER MANAGING METHOD, AND PROGRAM

BACKGROUND OF THE INVENTION

The present invention relates to a character data managing system, character server, character data managing method, and program, usable with game terminals, cellular phones, and network communication terminals and the like. Particularly, the present invention relates to a character data managing system, character server, character data managing method, and program, wherein a game player can hold an own character on a server and feature the same character in multiple games, having a configuration for executing processing wherein character information is notified to other characters or character users.

Let us consider an RPG (role-playing game) as an example of a conventional network game. Players can converse with one another or perform shared activities such as fighting with monsters in the virtual world of the game, thereby experiencing events in the game. However, there is no system wherein a player can use his/her own character in multiple different games, and neither is there a system wherein players can tell associated players the status of his/her own character throughout the multiple games, such as playing which game, or resting, for example, nor for disclosing character attributes, nor for sending messages to characters participating in a range of games.

Currently, with message processing in chat systems using the Internet, systems have been created wherein whether or not an associated individual is connected can be confirmed by registering a nickname or fictional name (hereafter, referred to as a "handle") of an associated user. However, in this case, the use is limited to rendezvousing for chat, and the system is most often limited to using a single chat application provided by the service provider.

SUMMARY OF THE INVENTION

Accordingly, it is an object of the present invention to provide a character data managing system, character server, character data managing method, and program, for structuring a character system whereby participation of characters is not restricted to a single application or a single virtual space, but wherein characters can participate in multiple different games and virtual spaces, and wherein the system configuration embodies a system which enables communication between the characters transcending the multiple different games and virtual spaces.

It is another object of the present invention to provide a character data managing system, character server, character data managing method, and program, enabling a player to feature his/her own character in multiple different games, and disclose the character status and character attributes to associated players throughout multiple games, and also enabling processing for sending messages to characters featured throughout multiple games.

It is a further object of the present invention to provide a character data managing system, character server, character data managing method, and program, to hold the character of a user in a character server so as to enable usage of his/her own character (e.g., a character having three-dimensional (hereafter written "3-D") information) in multiple games or virtual spaces, and further enabling usage of attributes or items which a character has obtained in one game in other games as well.

To this end, according to a first embodiment of the present invention, a character data managing system, for managing character data displayed on a communication terminal device, includes: a character server storing character information which is information relating to characters set corresponding to a number of users; and communication terminal devices capable of downloading, from the character server, character information set corresponding to the users; wherein character information stored in the character server may contain information disclosure settings information as to other characters; and wherein the character server follows the information disclosure settings information to execute information communication control between communication terminal devices using characters registered in the character server.

The character data managing system may further include a game server for providing game programs executable at the communication terminal device; wherein the communication terminal device further includes game program execution processing parts for downloading a character registered in the character server to the communication terminal device and executing a game provided by the game server featuring the downloaded character.

The information disclosure settings information within character information stored in the character server may contain character usage destination information; the character usage destination information may contain the address of a communication terminal device currently using a character; and the character server may execute processing for disclosing the address to another character wherein character information is registered in the character server, or another character managing user.

The information disclosure settings information within character information stored in the character server may contain character usage destination information; the character usage destination information may contain the address of a network game server currently using a character; and the character server may execute processing for disclosing the address to another character wherein character information is registered in the character server, or another character managing user.

The information disclosure settings information within character information stored in the character server may contain disclosure range information; the disclosure range information may contain data correlating disclosure range information within character information and disclosure destination character information; and the character server may execute processing for disclosing the character information to another character wherein character information is registered in the character server, or another character managing user, following the setting conditions of the disclosure range information.

The information disclosure settings information within character information stored in the character server may contain a buddy character list; the buddy character list may contain other character information data to which character information is disclosable; and the character server may execute processing for disclosing the character information to another character wherein character information is registered in the character server, or another character managing user, following the character conditions registered in the buddy character list.

The information disclosure settings information within character information stored in the character server may contain message termination settings information; the message termination settings information may contain settings data regarding whether or not reception or termination of messages from another character wherein character information is registered in the character server or another character managing user is permissible; and the character server may execute processing for transmission of a message from another character wherein character information is registered in the character server, or another character managing user, following the message termination settings information.

The character server may execute authentication processing to the communication terminal device, and executes data transmission to the communication terminal device under the conditions that authentication is established.

The character server may obtain character usage destination information from character usage destination information within character information corresponding to a buddy character based on buddy character identification data registered in the character information, in response to reception of a character state transmission request from the communication terminal device, and executes processing for transmitting the character status obtained by inquiry to the obtained character usage destination information, to the communication terminal device which has made the character state transmission request.

The character server may obtain character usage destination information from character usage destination information within character information corresponding to a buddy character based on buddy character identification data registered in the character information, in response to reception of a character state transmission request from the communication terminal device, and execute processing for transmitting the character status obtained by inquiry to the obtained character usage destination information, and the address information of a game server providing the game program in which the buddy character is participating, to the communication terminal device which has made the character state transmission request.

The communication terminal device may execute access to the game server following address information of the game server providing the game program in which the buddy character obtained from the character server is participating, and execute game participation processing of own character obtained by downloading from the character server.

According to a second embodiment of the present invention, a character server for managing character data to be displayed on a communication terminal device includes a database storing character information which is information relating to characters set corresponding to a number of users; wherein character information stored in the database contains information disclosure settings information as to other characters; and wherein information communication control is executed between communication terminal devices using the characters registered in the character server.

The information disclosure settings information may contain character usage destination information; the character usage destination information may contain the address of a communication terminal device using a character; and the character server may execute processing for disclosing the address to another character wherein character information is registered in the character server, or another character managing user.

The information disclosure settings information may contain character usage destination information; and the character usage destination information may contain the address of a network game server using a character; and the character server may execute processing for disclosing the address to another character wherein character information is registered in the character server, or another character managing user.

The information disclosure settings information may contain disclosure range information; the disclosure range information may contain data correlating disclosure range information within character information and disclosure destination character information; and the character server may execute processing for disclosing the character information to another character wherein character information is registered in the character server, or another character managing user, following the setting conditions of the disclosure range information.

The information disclosure settings information may contain a buddy character list; the buddy character list may contain other character information data to which character information is disclosable; and the character server may execute processing for disclosing the character information to another character wherein character information is registered in the character server, or another character managing user, following the character conditions registered in the buddy character list.

The information disclosure settings information may contain message termination settings information; the message termination settings information may contain settings data regarding whether or not reception or termination of messages from another character wherein character information is registered in the character server or another character managing user is permissible; and the character server may execute processing for transmission of a message from another character wherein character information is registered in the character server, or another character managing user, following the message termination settings information.

The character server may execute authentication processing to the communication terminal device, and execute data transmission to the communication terminal device under the conditions that authentication is established.

The character server may obtain character usage destination information from character usage destination information within character information corresponding to a buddy character based on buddy character identification data registered in the character information, in response to reception of a character state transmission request from the communication terminal device, and execute processing for transmitting the character status obtained by inquiry to the obtained character usage destination information, to the communication terminal device which has made the character state transmission request.

The character server may obtain character usage destination information from character usage destination information within character information corresponding to a buddy character based on buddy character identification data registered in the character information, in response to reception of a character state transmission request from the communication terminal device, and execute processing for transmitting the character status obtained by inquiry to the obtained character usage destination information, and the address information of a game server providing the game program in which the buddy character is participating, to the communication terminal device which has made the character state transmission request.

According to a third embodiment of the present invention, a character data managing method for managing character data displayed on a communication terminal device includes: a step for storing, in a character server, character information containing information disclosure settings information of other characters which is information relating to characters set corresponding to a number of users; and a step for executing information communication control between communication terminal devices using characters registered in the character server, following the information disclosure settings information.

The character data managing method may further enable, at the communication terminal device, transferring of a character registered in the character server to the communication terminal device and executing a game provided by the game server featuring the downloaded character.

The information disclosure settings information within character information stored in the character server may contain character usage destination information; the character usage destination information may contain the address of a communication terminal device currently using a character; and the character server may execute processing for disclosing the address to another character wherein character information is registered in the character server, or another character managing user.

The information disclosure settings information within character information stored in the character server may contain character usage destination information; the character usage destination information may contain the address of a network game server currently using a character; and the character server may execute processing for disclosing the address to another character wherein character information is registered in the character server, or another character managing user.

The information disclosure settings information within character information stored in the character server may contain disclosure range information; the disclosure range information may contain data correlating disclosure range information within character information and disclosure destination character information; and the character server may execute processing for disclosing the character information to another character wherein character information is registered in the character server, or another character managing user, following the setting conditions of the disclosure range information.

The information disclosure settings information within character information stored in the character server may contain a buddy character list; the buddy character list may contain other character information data to which character information is disclosable; and the character server may execute processing for disclosing the character information to another character wherein character information is registered in the character server, or another character managing user, following the character conditions registered in the buddy character list.

The information disclosure settings information within character information stored in the character server may contain message termination settings information; the message termination settings information may contain settings data regarding whether or not reception or termination of messages from another character wherein character information is registered in the character server or another character managing user is permissible; and the character server may execute processing for transmission of a message from another character wherein character information is registered in the character server, or another character managing user, following the message termination settings information.

The character server may execute authentication processing to the communication terminal device, and executes data transmission to the communication terminal device under the conditions that authentication is established.

The character server may obtain character usage destination information from character usage destination information within character information corresponding to a buddy character based on buddy character identification data registered in the character information, in response to reception of a character state transmission request from the communication terminal device, and execute processing for transmitting the character status obtained by inquiry to the obtained character usage destination information, to the communication terminal device which has made the character state transmission request.

The character server may obtain character usage destination information from character usage destination information within character information corresponding to a buddy character based on buddy character identification data registered in the character information, in response to reception of a character state transmission request from the communication terminal device, and execute processing for transmitting the character status obtained by inquiry to the obtained character usage destination information, and the address information of a game server providing the game program in which the buddy character is participating, to the communication terminal device which has made the character state transmission request.

The communication terminal device may execute access to the game server following address information of the game server providing the game program in which the buddy character obtained from the character server is participating, and execute game participation processing of own character obtained by downloading from the character server.

According to a fourth embodiment of the present invention, a storing medium stores a program for executing, on a computer system, character data management processing for managing character data displayed on a communication terminal device, the program including a step for executing information communication control between communication terminal devices using characters registered in the character server, following information disclosure settings information for other characters contained in character information, which is information relating to characters registered in the character server and set corresponding to a number of users.

The program may further enable, at the communication terminal device, transferring of a character registered in the character server to the communication terminal device and executing a game provided by the game server featuring the downloaded character.

The information disclosure settings information within character information stored in the character server may contain character usage destination information; the character usage destination information may contain the address of a communication terminal device currently using a character; and the character server may execute processing for disclosing the address to another character wherein character information is registered in the character server, or another character managing user.

The information disclosure settings information within character information stored in the character server may contain character usage destination information; the character usage destination information may contain the address of a network game server currently using a character; and the character server may execute processing for disclosing the address to another character wherein character information is registered in the character server, or another character managing user.

The information disclosure settings information within character information stored in the character server may contain disclosure range information; the disclosure range information may contain data correlating disclosure range information within character information and disclosure destination character information; and the character server may execute processing for disclosing the character information to another character wherein character information is registered in the character server, or another character managing user, following the setting conditions of the disclosure range information.

The information disclosure settings information within character information stored in the character server may contain a buddy character list; the buddy character list may contain other character information data to which character information is disclosable; and the character server may execute processing for disclosing the character information to another character wherein character information is registered in the character server, or another character managing user, following the character conditions registered in the buddy character list.

The information disclosure settings information within character information stored in the character server may contain message termination settings information; the message termination settings information may contain settings data regarding whether or not reception or termination of messages from another character wherein character information is registered in the character server or another character managing user is permissible; and the character server may execute processing for transmission of a message from another character wherein character information is registered in the character server, or another character managing user, following the message termination settings information.

The program may effect the character server executing authentication processing to the communication terminal device, and executing data transmission to the communication terminal device under the conditions that authentication is established.

The program may effect the character server obtaining character usage destination information from character usage destination information within character information corresponding to a buddy character based on buddy character identification data registered in the character information, in response to reception of a character state transmission request from the communication terminal device, and executing processing for transmitting the character status obtained by inquiry to the obtained character usage destination information, to the communication terminal device which has made the character state transmission request.

The program may effect the character server obtaining character usage destination information from character usage destination information within character information corresponding to a buddy character based on buddy character identification data registered in the character information, in response to reception of a character state transmission request from the communication terminal device, and executing processing for transmitting the character status obtained by inquiry to the obtained character usage destination information, and the address information of a game server providing the game program in which the buddy character is participating, to the communication terminal device which has made the character state transmission request.

The program may effect the communication terminal device executing access to the game server following address information of the game server providing the game program in which the buddy character obtained from the character server is participating, and executing game participation processing of own character obtained by downloading from the character server.

Note that the program according to the present invention can be provided to a general-purpose computer system capable of executing various types of computer code, being stored in a computer-readable format in a recording medium such as a CD, DVD, floppy disk, MO, etc., and also may be provided by a transfer medium such as a network or the like.

Such a program stipulates the execution of each of the functions which the system has, under the control of a processor, based on the reading out of the program, and also exhibits cooperative actions on the system, thereby yielding advantages the same as the other aspects of the present invention.

Further objects, characteristics, and advantages of the present invention will become apparent by the later-described embodiments of the present invention and detailed description based on the attached drawings. Note that in the present specification, the term "system" represents the logical collective configuration of multiple devices, and each of the component devices may or may not be within the same housing.

BRIEF DESCRIPTION OF THE FIGURES

FIG. 19 is a diagram illustrating an example of a screen displayed on the communication terminal of the user in state notification processing for a character.

DETAILED DESCRIPTION OF THE INVENTION

System Overview

Figure 1:
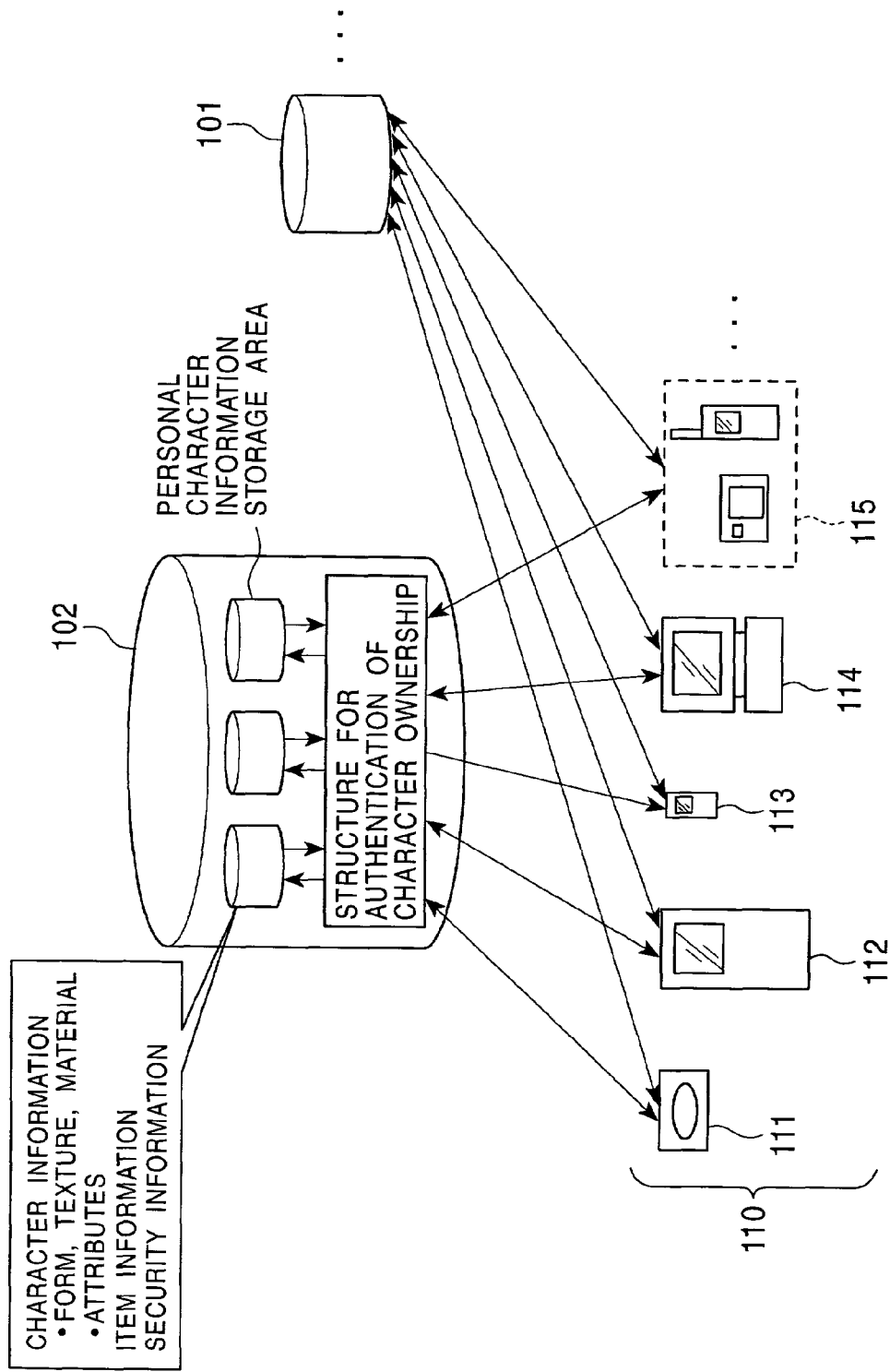
FIG. 1 is a diagram illustrating the overview of the configuration of the character data managing system according to the present invention.

FIG. 1 illustrates a configuration example of the character data managing system according to the present invention. A user which plays various games accesses a network game server 101, and executes the various games provided from the network game server 101 using a communication terminal device 110 having communication capabilities, for example, a home game device 111, an arcade game device 112, a portable game device 113, a network computer 114, a network portable terminal 115 such as a cellular telephone or the like, etc.

Also, the user accesses a character server 102 from the communication terminal device, and obtains characters to be featured in various games provided from the network game server 101. The character server 102 has a personal character information storage which stores character information which each user has registered beforehand, whereby users attempting to obtain characters or attempting to download character information (e.g., 3-D character information) from the character server 102 to the communication terminal device 110, can obtain characters from the character server 102 following execution of user confirmation by later-described authentication processing.

The user features the character obtained from the character server 102 in various games provided by the network game server 101. For example, in the event of the fighting game, the character fights with characters of other users, or in the event that the game is an automobile race, the character races with automobiles driven by characters of the other users.

In this way, users can feature the same characters in various games. Also, with some game programs, processing for changing capability values, attributes, etc., correlated with a character, are changed, by executing a game in which the character is featured. In such a case, the change in capability values, attributes, etc., correlated with the character, is saved as character accessory information and at the time of returning the user's own registered character from the communication terminal device 110 to the character server 102 after the game; i.e., at the time of uploading, the capability values, attributes, etc., are also uploaded along with the character (e.g., 3-D information), and saved in the character server 102. The next time the user downloads his/her own registered character from the character server 102, the character will have the updated capability values, attributes, etc.

Character information registered in the character server 102 is: the form of the character, 3-D information including colors and the like, attributes information such as properties and the like, item information such as clothes and the like, social information such as names and the like, history information such as usage time and the like, and security information such as passwords and the like. These will be described later.

Further, character information registered in the character server 102 includes: character usage destination information, disclosure range of information, a buddy character list, message termination settings information and like information disclosure settings information. These will also be described later.

[System Configuration]

Figure 2:
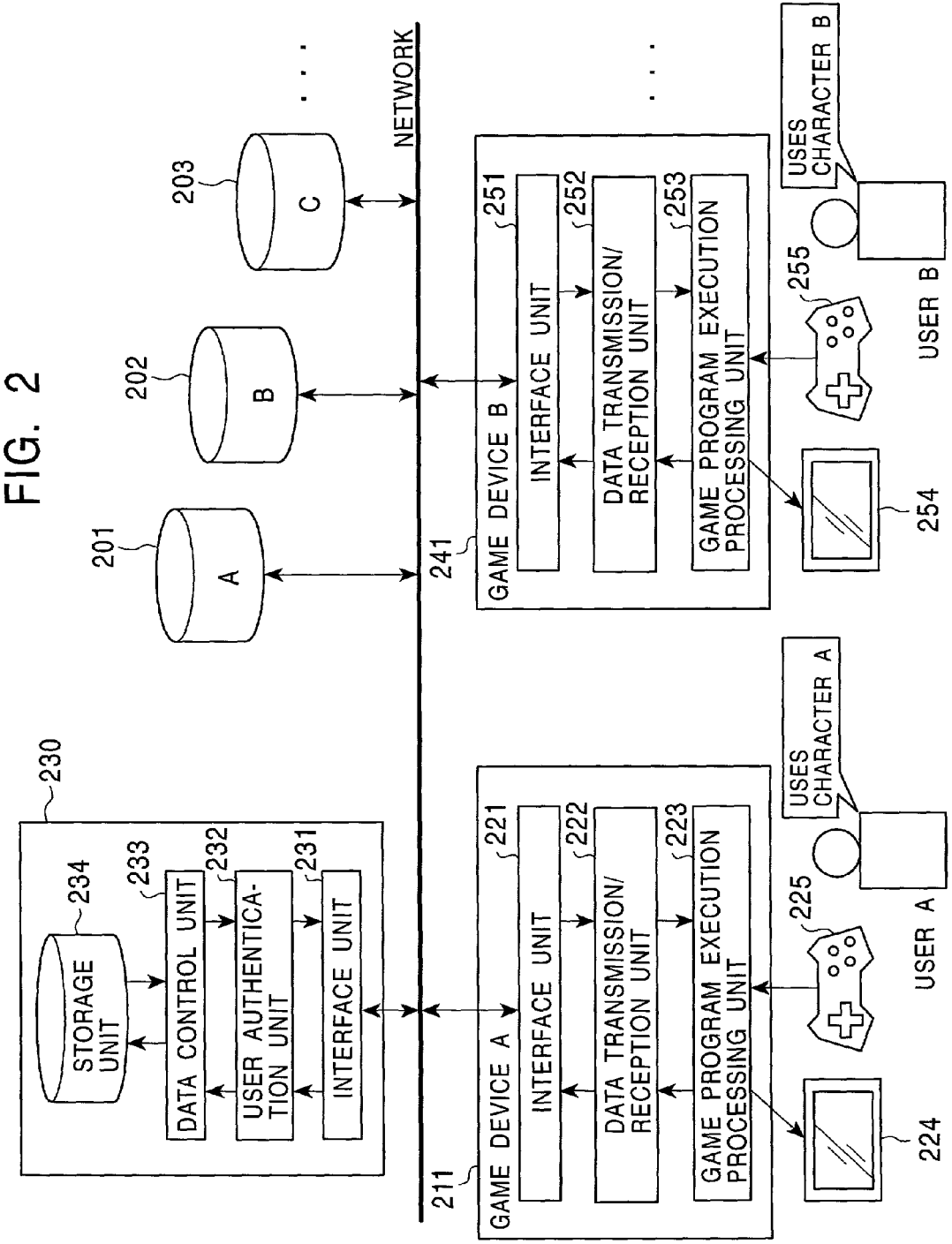
FIG. 2 is a diagram describing the components of the character data managing system according to the present invention.

FIG. 2 shows a network system configuration example. Network game servers 201, 202, and 203 are servers for distributing various types of games. These include the various types of games which game distribution service providers or other information providing entities provide, either as pay information or free of charge.

Figure 3:
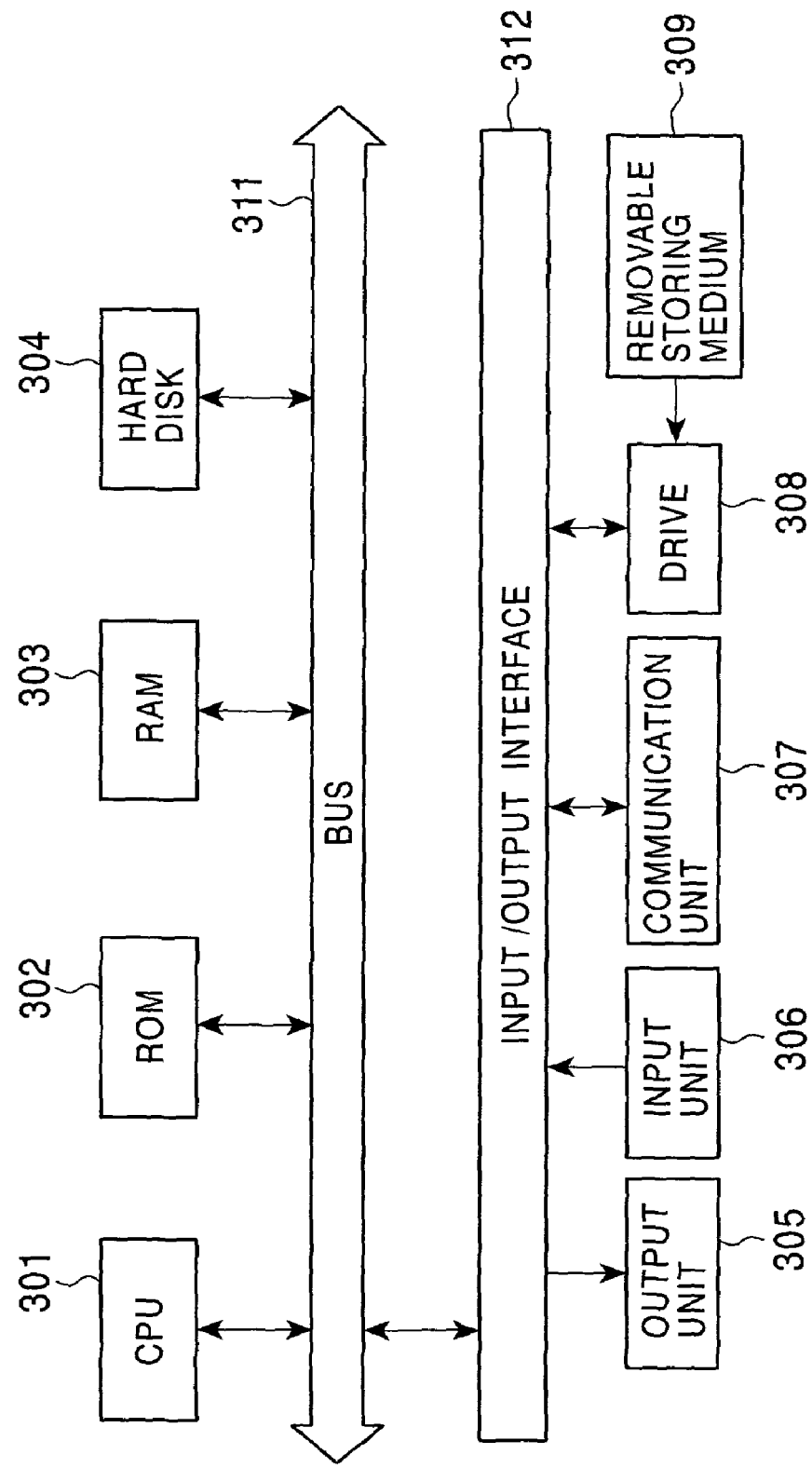
FIG. 3 is a diagram illustrating a configuration example of a communication terminal device (game device) of the character data managing system according to the present invention.

Users having game devices 211 and 241 access the network game servers 201, 202, and 203, via various types of networks, either cable or wireless. The game devices 211 and 241 have an interface unit 221 and a data transmission/reception unit 222, and further have a game program execution processing unit 223 including a CPU or the like for performing game execution processing. Also, the game devices 211 and 241 also have a configuration wherein an image display unit 224 for displaying game contents and the like, and an input device 225 such as a controller or the like for executing various types of input to the game, are connectable to the game device, or integrally formed therewith. FIG. 3 shows a specific example of the game devices 211 and 241.

The game device has a CPU (Central Processing Unit) 301, with the CPU 301 being connected to an input/output interface 312 via a bus 311, and in the event that commands are input via the input/output interface 312 by operating of an input device such as a controller or the like, or an input unit 306 such as a keyboard or mouse, the CPU 301 accordingly executes programs stored in a memory such as ROM (Read-Only Memory) 302, a hard disk 304, etc.

The CPU 301 is also capable of loading into RAM (random access memory) 303 and executing programs which have been transferred from the satellite or network and installed in the hard disk 304 upon reception with the communication unit 307, or programs read out of removable recording media 309 mounted to the drive 308 and installed in the hard disk 304.

Thus, the CPU 301 performs execution processing of various types of game programs. The CPU 301 also executes output processing to an output unit 305 configured of an LCD (liquid crystal display), speakers, etc., transmission processing from the communication unit 307, and further, recording processing to the hard disk 304, via the input/output interface 312, as necessary.

Now, returning to FIG. 2, let us continue with the description of the network system configuration. The users having the game device 211 and 241 access network game servers 201, 202, and 203, execute processing for downloading necessary game programs or the like, and enable execution of the programs within the game devices 211 and 241. Further, the users access the character server 230, and obtain characters to feature in the games; i.e., download the characters.

Figure 4:
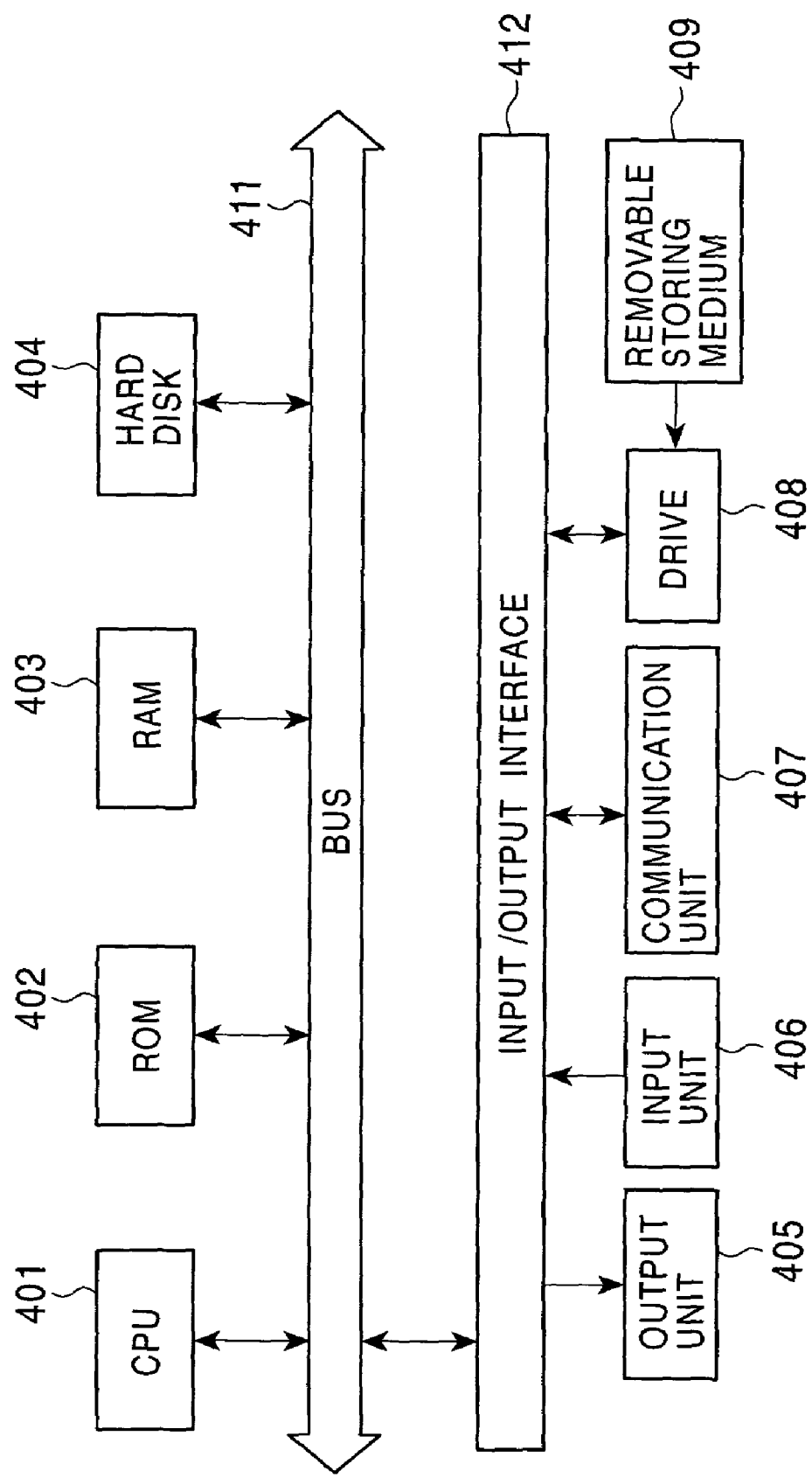
FIG. 4 is a diagram illustrating a configuration example of a character server of the character data managing system according to the present invention.

The character server 230 includes an interface unit 231 for executing communication processing via networks, a user authentication unit 232 for executing authentication processing of users, a data control unit 233 for executing data storage or extraction of character information, and like processing, and a storage unit 234 serving as a database storing character information, user information and the like. FIG. 4 shows a specific configuration example of the character server 230.

The character server 230 has a CPU (Central Processing Unit) 401, with the CPU 401 being connected to an input/output interface 412 via a bus 411, and in the event that commands are input via the input/output interface 412 from the input unit 406 or received from the communication unit 407, the CPU 401 accordingly executes programs stored in a memory such as ROM (Read-Only Memory) 402, a hard disk 404, etc.

The CPU 401 executes authentication processing by a command from a game device of the user via the network, for example, and also executes character information extraction, storage, updating processing, etc. The CPU 401 performs various types of character managing processing. The CPU 401 also executes output processing to an output unit 405 configured of an LCD (liquid crystal display) or the like, transmission processing from the communication unit 407, and further, recording processing to the hard disk 404, via the input/output interface 412, as necessary.

[Character and Character Server Storage Information]

Figure 5:
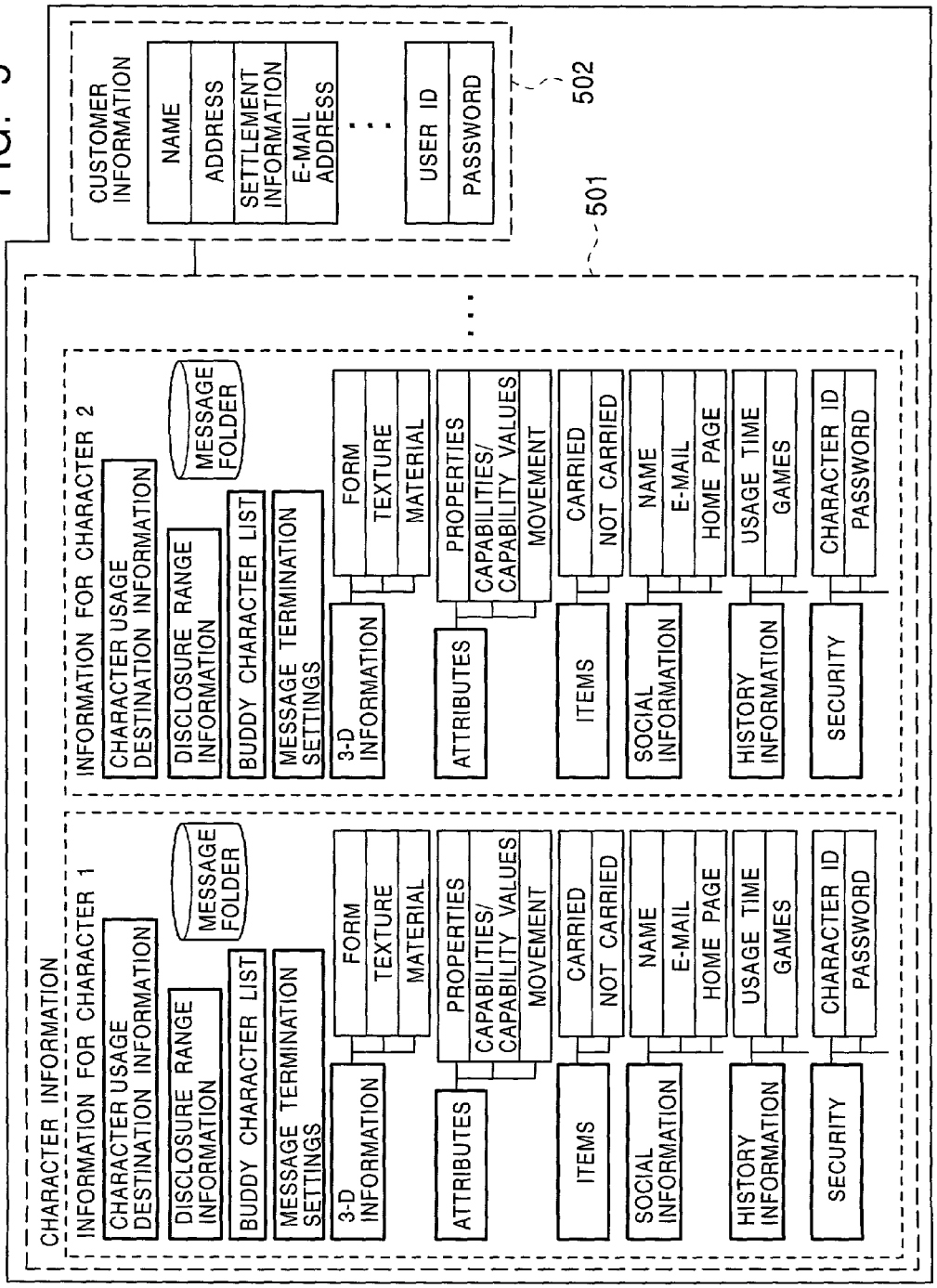
FIG. 5 is a diagram describing stored information in the character server of the character data managing system according to the present invention.

FIG. 5 shows a configuration example of information stored in the character server. The character server stores at least character information 501 and customer (user) information 502.

The user information 502 is information relating to user which has registered a character with the character server, with the name, address, settlement information, e-mail address, user ID, etc., being registered. Further, a user ID and password and the like necessary for user authentication are stored. User authentication processing using a necessary user ID and password will be described later.

The character information 501 area has a storage area for storing character information of the user, and also has a message folder for storing messages distributed to the characters. FIG. 5 illustrates configuration examples of the information storing area for the characters 1 and 2.

As shown in FIG. 5, character information contains character usage destination information, disclosure range information, a buddy character list, message termination settings information, and other like information disclosure settings information, and further contains 3-D information, attributes information, items information, social information, history information, and security information.

(Types of Characters, and Methods for Creating)

Data which can be registered as a character includes the following:

1. Character Serving as Another Self of the Game Player

This is a character which acts on behalf of the player to carry out the role in the game. A character serving as another self of the game player can first be conceived as a character with similar physical characteristics and fashion preferences. However, characters of the opposite sex or with different physical characteristics make be conceived, and further, animals or fictional or imaginary creatures (e.g., monsters) may serve in this capacity instead of humans.

2. Pet Character

This is a character which is not the player him/herself, to carry out the role in the game. For example, this may be a monster accompanying the character serving as another self of the game player in a role-playing game, a horse featured in a horse race game, and so forth.

The characters of each individual user may be created by each user, or may provided by a provider. The various methods may be applied for the users to obtain characters, such as a method wherein the user accesses the character server from a server access terminal (the device, computer terminal, network portable terminal, etc.), selects a character which the character server operator has prepared beforehand, so as to obtain his/her own character, a method wherein the user edits a character prepared beforehand at the server access terminal and then upholds the edited character to the character server, a method wherein the user uploads a character which he/she created using a character editor, and method wherein a character is uploaded that has been generated based on 2-D images photographed with a camera or 3-D physical information (form, texture) photographed with a 3-D digitizer, and so forth.

1. Ready-Made Characters

Characters serving as another self of the game player can be given originality by causing the character to wear or hold items which the game player wears or holds. Of course, the character can be given further originality and by taking a character provided beforehand and editing this character by selecting from parts lists of eyes, noses, mouth, etc., selecting hairstyles, and adjusting the length of arms and legs and by the height.

2. Creating with a Character Editor

Users can create their own characters using tools for creating characters, such as already-existing image editing tools, 3-D computer graphics software, and so forth.

3. Creating Characters Based on Personal Data

For example, a 3-D digitizer may be used to obtain 3-D form information and texture information of the body of an individual, and create a character based on that information, thereby generating a character having the physical characteristics of the individual. Reflecting the physical characteristics of the individual in the character is advantageous in playing games where in many individuals participate, for telling one player from another, and for emotional attachment to characters.

Next, information stored in the character server will be described.

(3-D Information)

Figure 6:
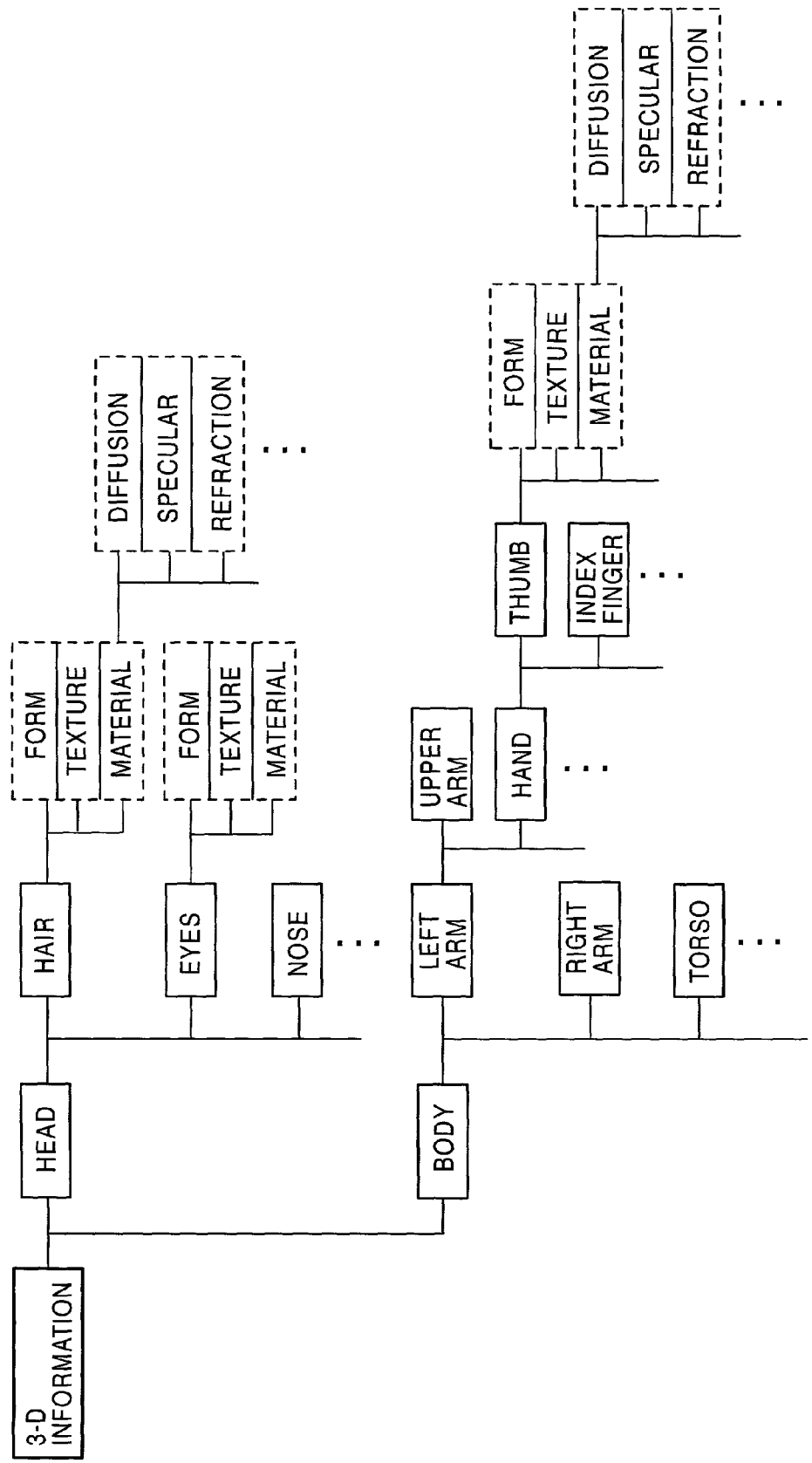
FIG. 6 is a diagram describing the data configuration of 3-D information within the character information stored in the character server.

3-D information is data which is stored in the event that the character is being generated as 3-D data, and includes 3-D form data, the color of the surface, designs, etc., in the form of textured, material information, and so forth. As shown in FIG. 6, the data configuration of the 3-D information data is of a hierarchical structure of the parts of the character, e.g., head, torso, eyes, arms, etc., with texture and material information serving as 3-D form data, surface color, design, etc. for each of the parts; for example, in the form of diffusion, reflection, and refraction, of light, and so forth.

(Attributes)

Attributes information contains information relating to a "properties", "capabilities", "capability values", "movement", etc., of the character. For example, "properties" are attributes unique to the character, such as sex, age, date of birth, hobbies, favorite food, and so forth. Bringing such "properties" parameters into the game allows the way in which the game unfolds to be changed, in the same way as with "capabilities" described above.

"Capabilities" and "capability values" are used as follows. Let us say that a certain player uses his/her own character and plays a boxing game provided by company A, so that "boxing capabilities" are added to the character, and a "boxing level" is set to 50. Subsequently, in the event that the player uses the same character to play and inter-style fighting game provided by company B, that character may now be able to use boxing techniques which it could not have used with that game before, or may meet fighting characters which it would not have otherwise, making the games more enjoyable in many ways.

"Movement" indicates how the character laughs or walks, i.e., movement patterns, and movements can be used in the game by registering movements such as ways of laughing or victory poses befitting the player. These attributes are useful in assembling a personality like that of the player into the character.

Figure 7:
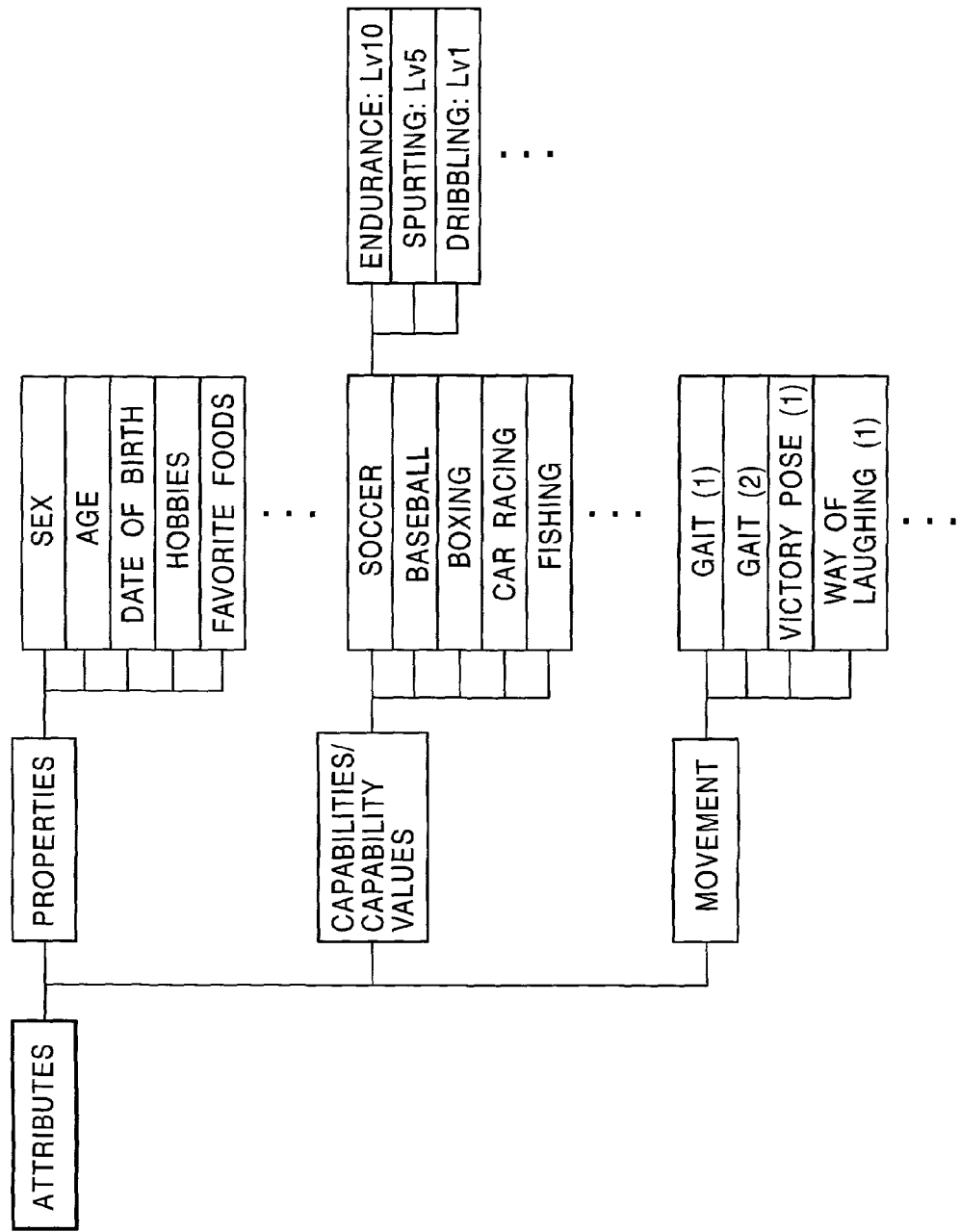
FIG. 7 is a diagram describing the data configuration of attributes information within the character information stored in the character server.

FIG. 7 illustrates a data configuration example of attributes information stored in the character server. The "properties" contained in the attributes include sex, age, date of birth, hobbies, favorite food, etc., and stored as "capabilities" and "capability values" are capabilities data set corresponding to various sports, such as soccer, baseball, boxing, car racing, fishing, for example. In the case of soccer, capability values for endurance, spurting, dribbling, etc., are stored as comparable data. "Movement" stores movement in data characteristic of the character, such as the gait, victory poses, laughter, etc., thereof.

(Items)

Figure 8:
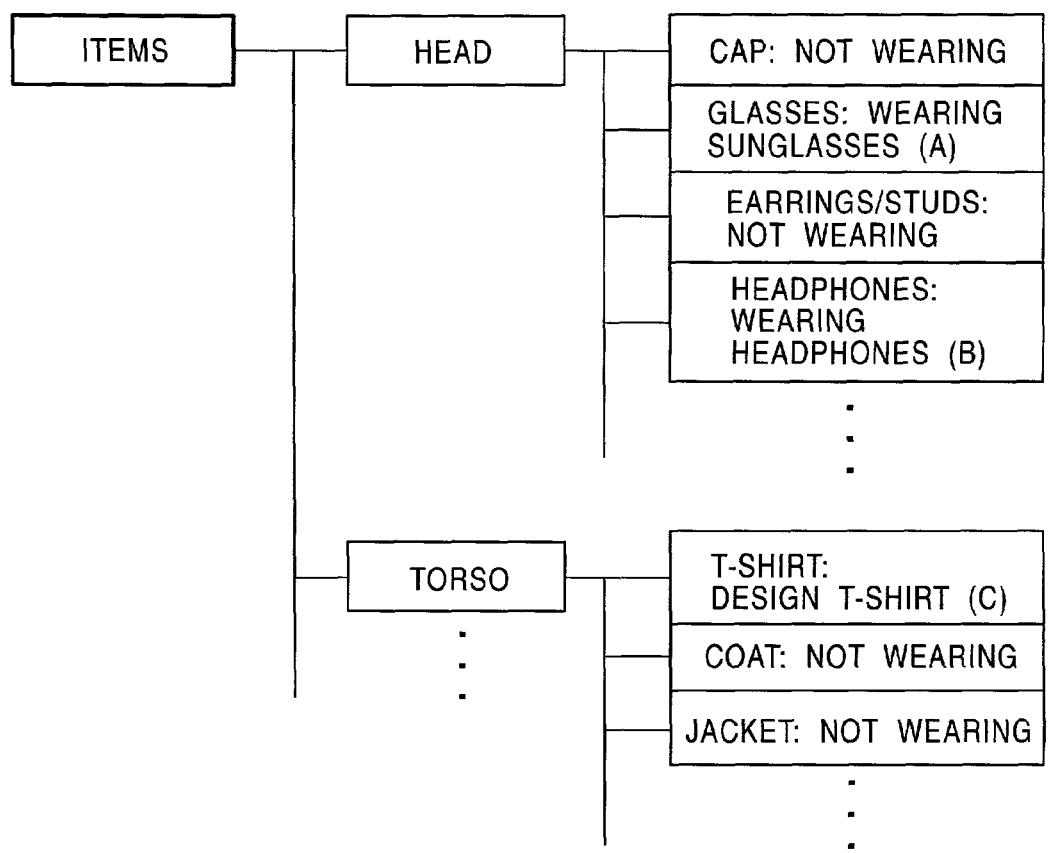
FIG. 8 is a diagram describing the data configuration of item information within the character information stored in the character server.

Items are information such as articles worn by the character, houses or cars owned by the character, and so forth. FIG. 8 shows the data configuration example of item information stored in the character server. Item information stored with regard to the head of the character includes information of articles worn such as hats, glasses, earrings/studs, headphones, and item information for the torso includes T-shirts, coats, jackets, etc. In the event that a character has multiple jackets, for example, one jacket can be selected to be worn. Additionally, information regarding houses, cars, etc., owned by the character, is also stored. Further, intangible digital contents such as music or pictures, or network currency such as a local money which can be used for purchasing and selling items, can be conceived as items.

(Social Information)

Figure 9A:
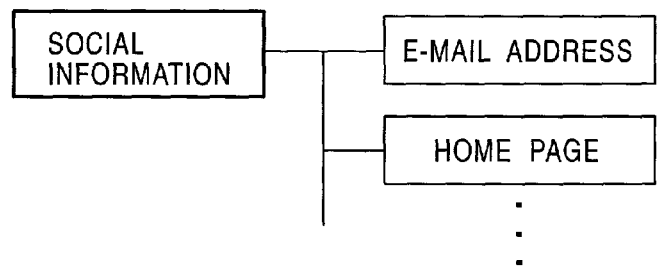
FIG. 9 is a diagram describing the data configuration of social information and history information within the character information stored in the character server.

Social information indicates external information which the character or user has, such as an E-mail address or a homepage URL. This information assists in communication between characters and between players. FIG. 9A shows a data configuration example of item information stored in the character server.

(About History Information)

Figure 9B:
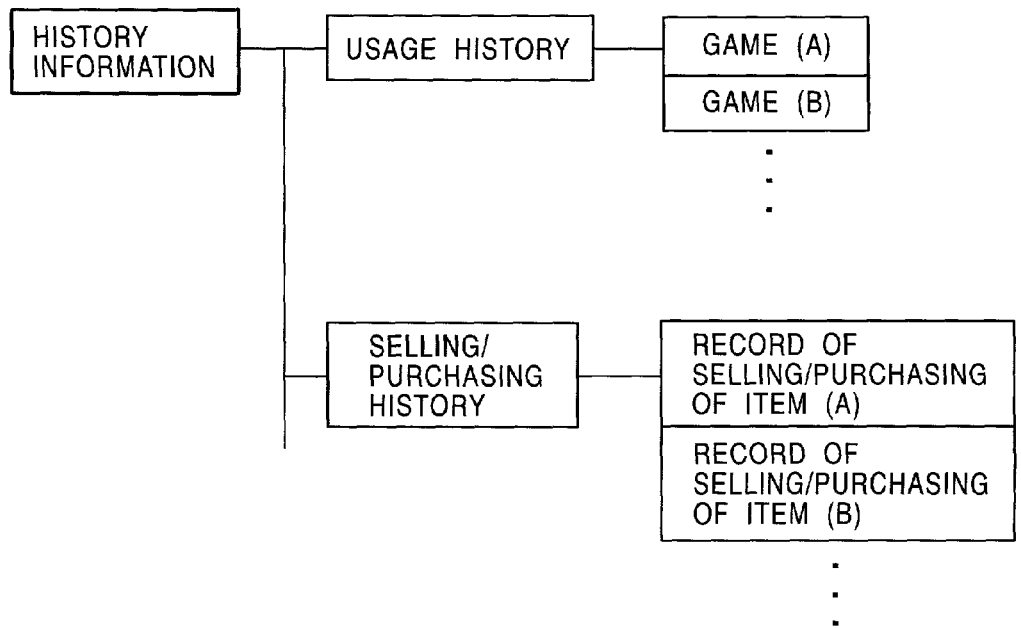

Usage history of the character in a game, or history of selling/purchasing items, can be conceived as history information. Usage history indicates the title of games played, the starting time, ending time, and so forth. Selling/purchasing history records how much of what was sold or purchased for how much, when and where. Selling/purchasing here is not restricted to selling and purchasing with actual geo-space currencies, and may include selling or purchasing with a local currency which is accepted within one or multiple games, or within a network, or, bartering. FIG. 9B illustrates a data configuration example of item information stored in the character server.

(Security Information)

Security information is information for performing authentication at the time of reading or writing character information on the server, and indicates, for example, user ID, password, fingerprint information, and so forth. Such information is normally encrypted when saved on a server.

(Character Usage Destination Information)

Figure 10:
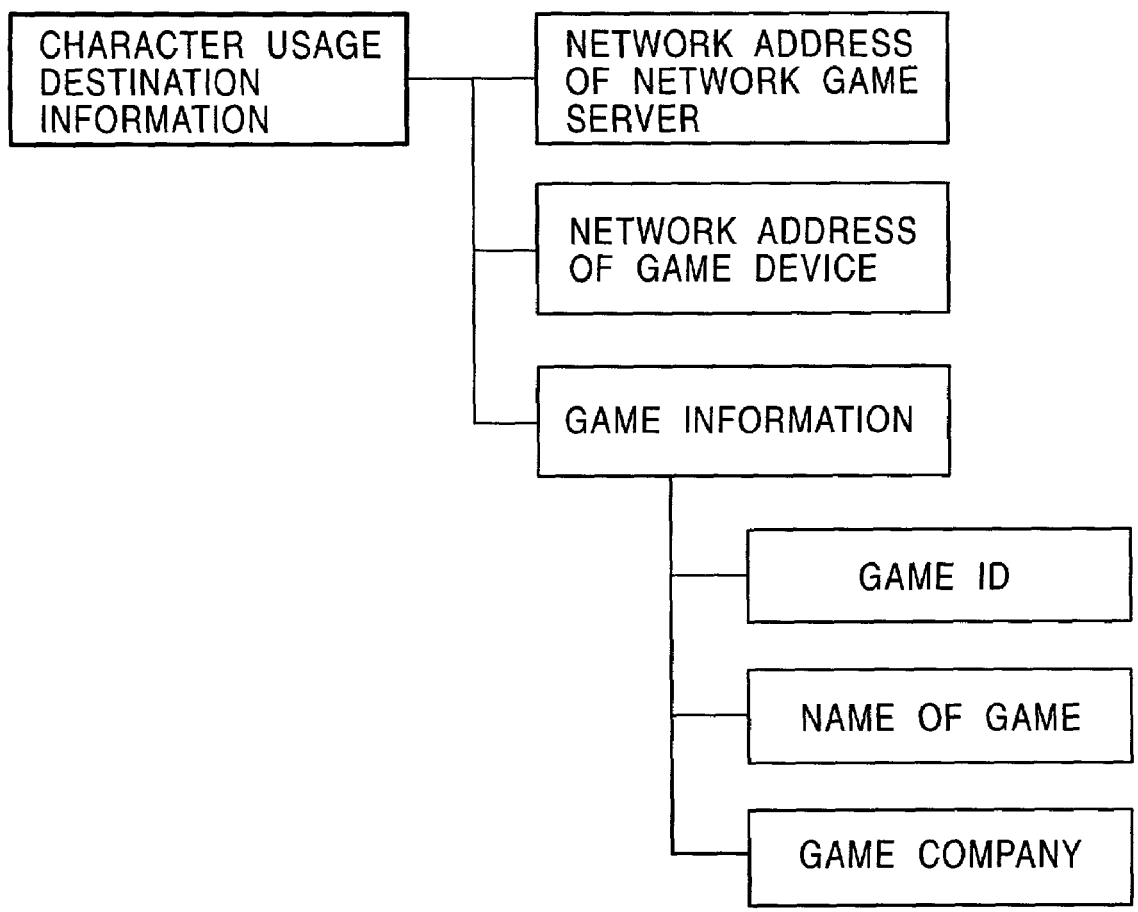
FIG. 10 is a diagram describing the data configuration of character usage destination information within the character information stored in the character server.

Character usage destination information is information regarding where the character is currently being used. FIG. 10 shows a data configuration example. The character usage destination information contains the network address of the network game server providing the game which is the usage destination of the character, the network address of the game device which is the character of the user is using, and further, as game information, a game identifier (ID), name of the game, game company, and so forth.

While described in the section for "disclosure range information", other users can also view this information, and in the event that there is a user B who wants to fight with a particular character which the user A has, the user B can search for which game the character which the user A has is currently participating in.

(Disclosure Range Information)

Figure 11:
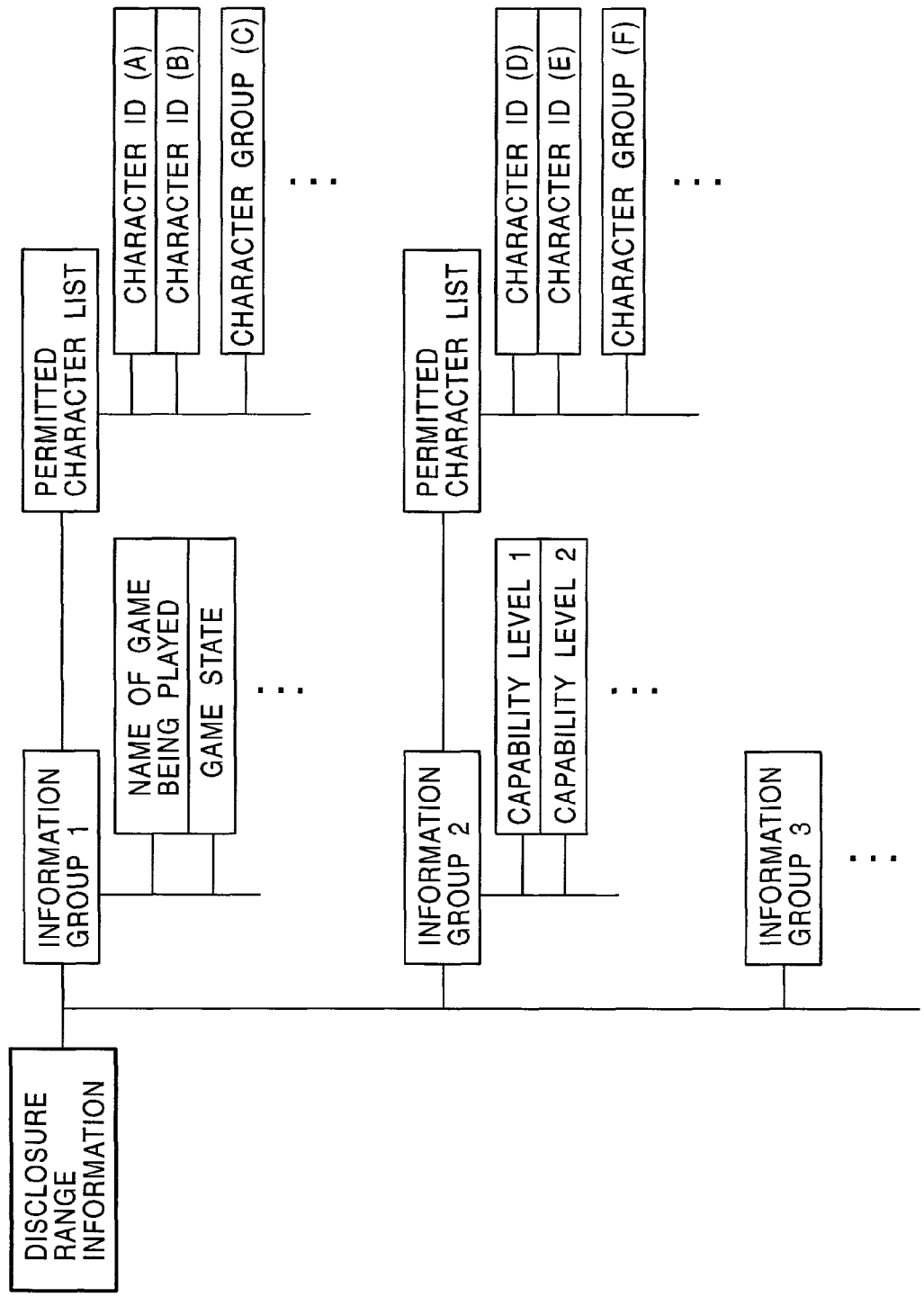
FIG. 11 is a diagram describing the data configuration of disclosure range information within the character information stored in the character server.

Disclosure range information is information setting how wide a range of information regarding the character will be disclosed to which characters, i.e., to other characters or the users of the other characters registered in the character server. FIG. 11 shows the data configuration example. In the configuration example in FIG. 11, the disclosure range information sets information disclosure ranges for each particular character group. The information of each character can be disclosed to characters regarding which this is permitted beforehand. In the example in FIG. 11, the information of "name of game being played" and "game state" are registered for "information group 1", and characters regarding which information is disclosed for the "information group 1" are kept for each information group, as a "permitted character list". Individual "character IDs" and "character groups" can be specified for the "permitted character list".

A "character group" is a group of characters registered in the character server which can be formed with associated players, so that information can be disclosed to buddy characters without making specifications for individual characters. For example, in the event that a character A which the user A has, and the character B which the user B has belong to the same group, and are registered as a character group S, and further are set as a permitted character list group corresponding to the information group in FIG. 11 the "name of game currently being played" and the "game state" of the character A which the user A has, and the character B which the user B has, for the information group one, can be mutually viewed.

Also, the service provider of the character server may make several levels of information groups, ranging from very close friends to not-so-close, letting the users select the level and set groups.

(Buddy Character List)

Figure 12:
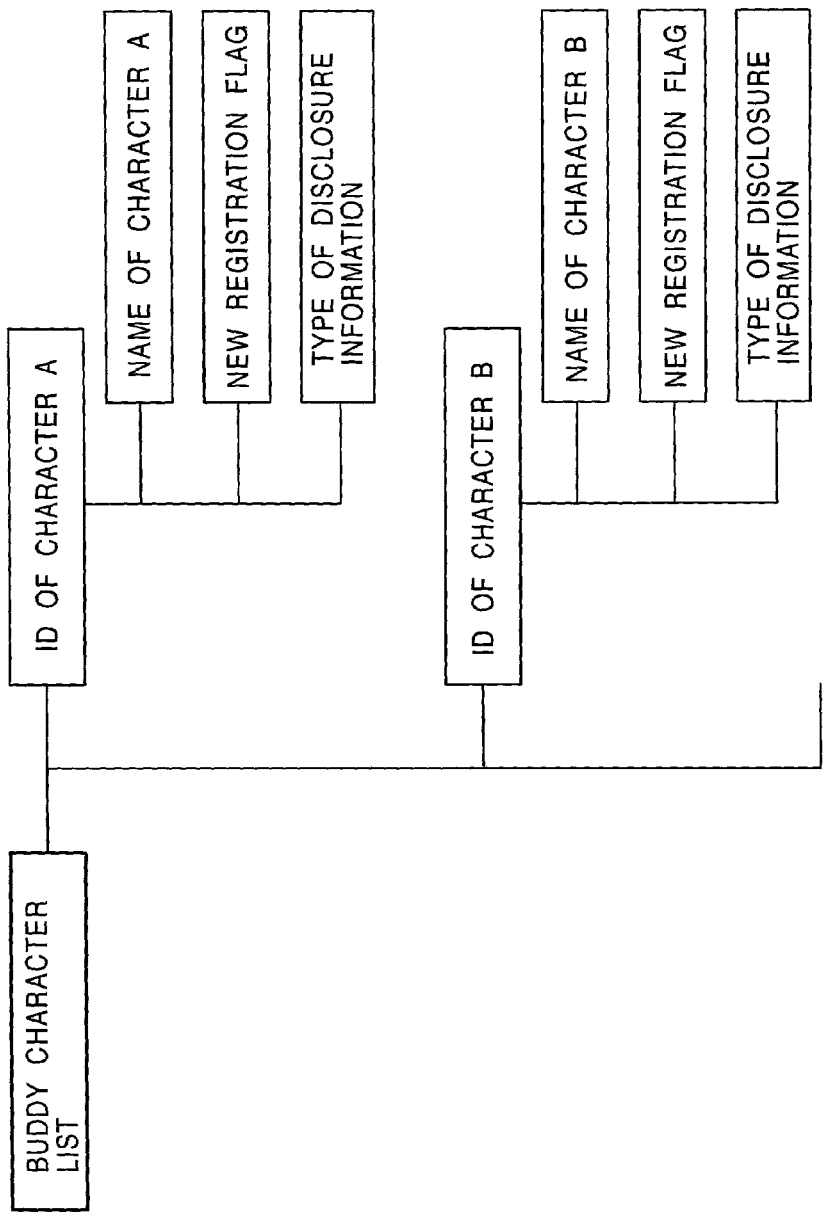
FIG. 12 is a diagram describing the data configuration of a buddy character list within the character information stored in the character server.

A buddy character list is a list corresponding to other characters or other character managing users which disclose information to the owner of the list; i.e., which have registered the character information in the character server. FIG. 12 shows a data configuration example. A buddy character list has characters registered as buddies with regard to a predetermined character as a list, with the name of the buddy character and the type of disclosed information being registered therein. The "new registration flag" is set to on in the event that this is a newly-registered buddy character. The processing for this setting will be described later.

(Message Termination Settings)

Figure 13:
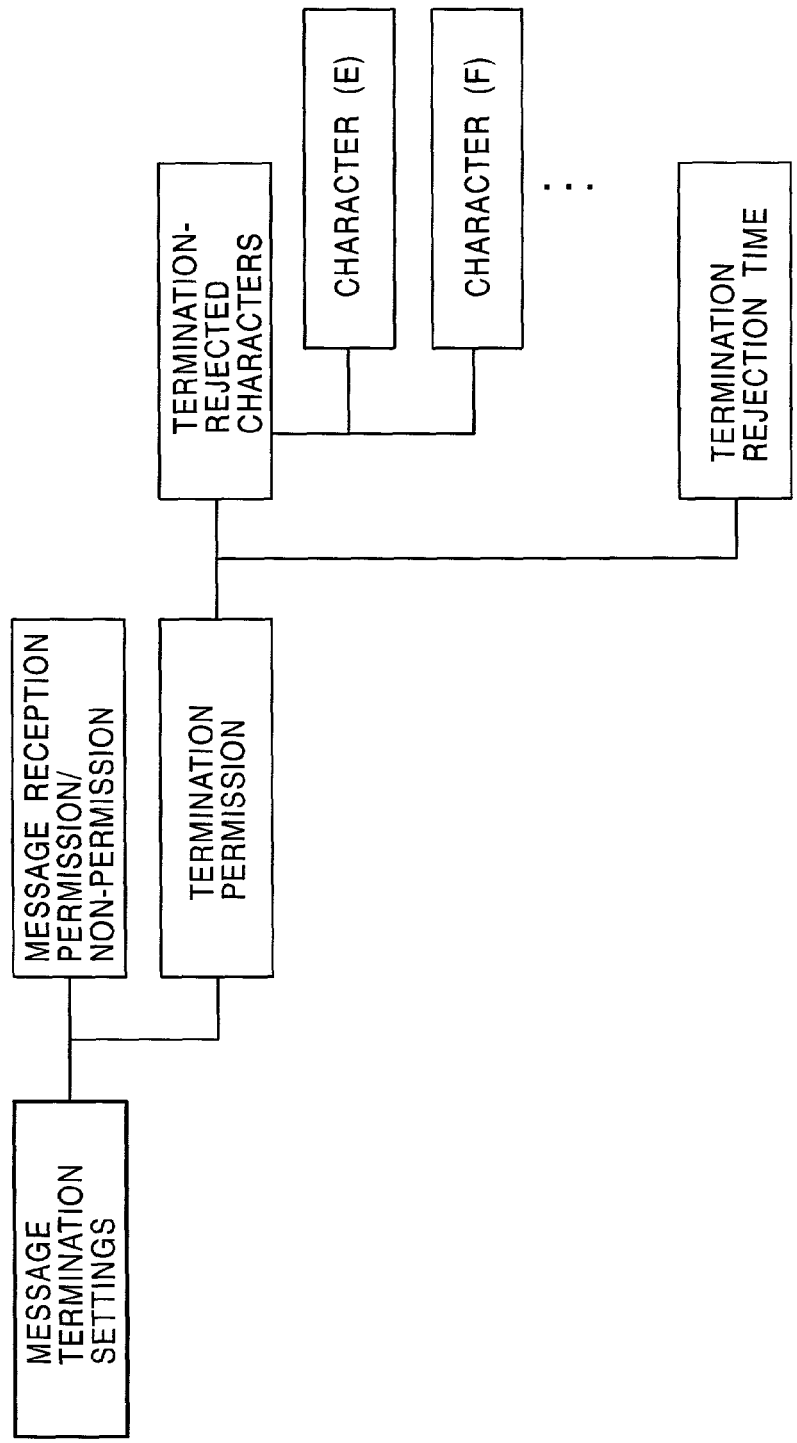
FIG. 13 is a diagram describing the data configuration of message termination settings information within the character information stored in the character server.

Message termination settings store message termination permission settings information. For example, message termination permission settings are made to restrict terminations of messages to a predetermined time, or with regard to an originating character; i.e., another character or another character managing user which has registered character information in the character server. FIG. 13 shows a data configuration example. For the message termination settings information, "message reception permission/non-permission" regarding whether or not reception of messages is permitted, and further, termination rejected characters can be set for termination permission. Moreover, settings can also be made for message termination permission times, and so forth.

[Downloading Character Information]

Figure 14:
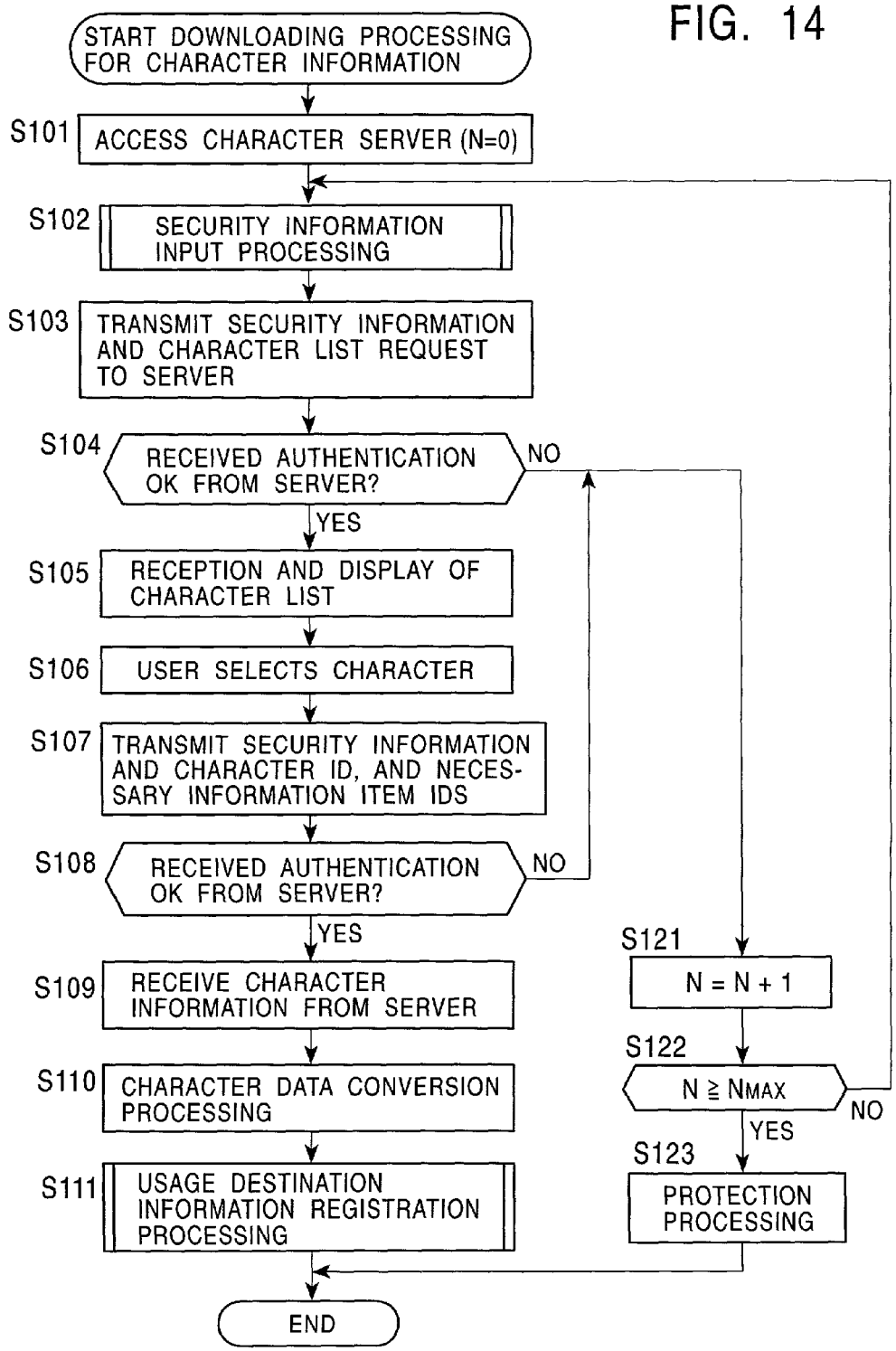
FIG. 14 is a flowchart describing the processing for downloading character information.

The following is a description of various types of processing which are executed by the character data managing system according to the present invention. First, processing wherein a communication terminal device such as the game device, cellular telephone, personal computer, etc., downloads a registered character from a character server will be described, with reference to FIG. 2 and the flowchart in FIG. 14.

A character on the character server 230 can be downloaded from the server to the game device 211 and used, by the user which is the owner. This task is generally performed at the time of starting a game.

In step S101, the communication terminal of the user (game device 211) accesses the character server 230 via the interface unit 221. The character server 230 requests the user to input the security information (S102). The user must first notify the server that he/she is a valid user, in order to display a list of his/her own characters owned in the character server 230, on the communication terminal device such as the game device 211 or the like. Thus, authentication processing is executed. The information necessary for this authentication processing is security information.

Figure 15A:
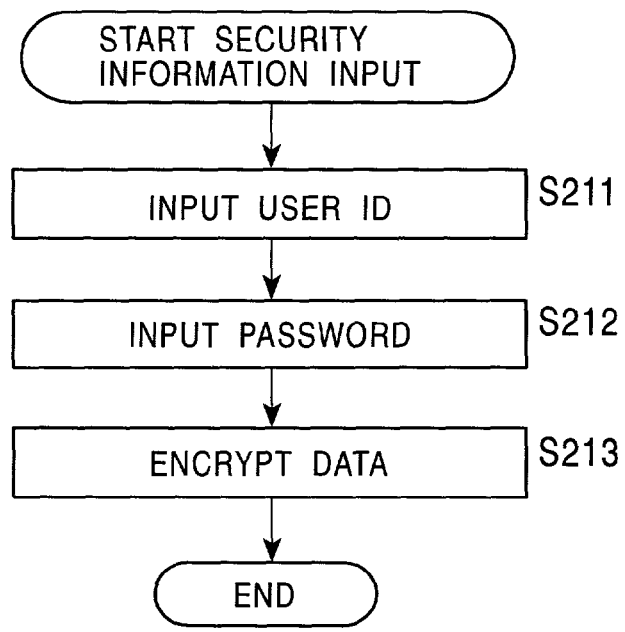
FIG. 15 is a flowchart describing the processing for downloading security information.
Figure 15B:
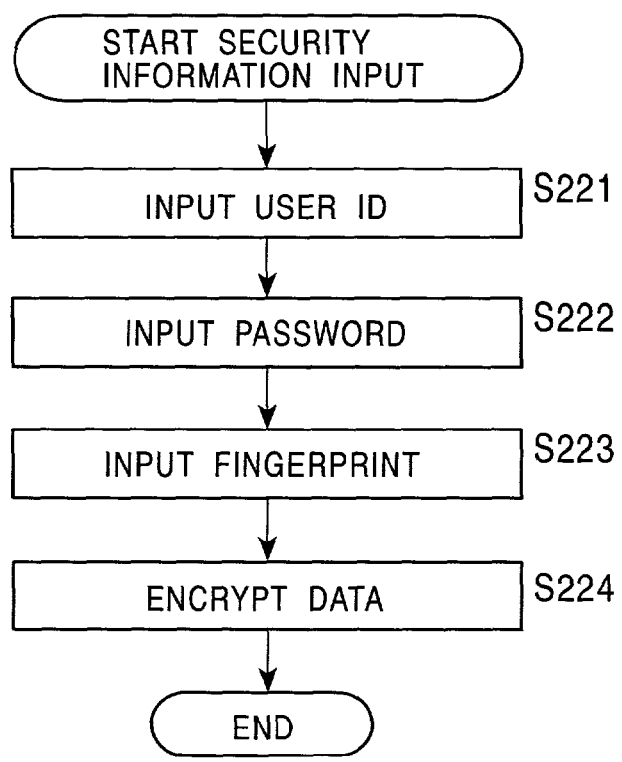

FIGS. 15A and B show a specific example of authentication processing. FIG. 15A is a processing sequence for authentication by user ID and password, and FIG. 15B is a processing sequence for performing authentication using information unique to an individual, such as fingerprints or the like. The processing in FIG. 15A is processing for executing input of user ID (S211), input of password (S212), and the data encryption (S213), and transmitting the encrypted data to the character server 230. The processing in FIG. 15B is processing for input of user ID (S221), input of password, (S222), input of fingerprint (S223), and data encryption (S224), and transmitting the encrypted data to the character server 230.

The encrypted security information is saved within memory in the data transmission/reception unit 222 of the terminal until an appropriate time; e.g., the time of ending the game, or in the case of a home game device, turning the power of the game device off. The encrypted security information and character list request are transmitted to the character server 230 via network, through the interface unit 221 of the terminal.

Also, an arrangement may be made wherein the above-described password input or the like is not used, with the user being distributed with memory cards or IC cards such as magnetic cards storing user-unique identification data beforehand, and the users reading the data stored in the cards into the game device, which is transmitted to the character server 230 and used for authentication processing.

Returning to FIG. 14, in step S103, upon transmission of the ID and other information necessary for authentication from the communication terminal device of the user (game device 211), the user authentication unit 232 of the character server 230 decrypts the encrypted data, obtains the user information (See 502 in FIG. 5) stored in the storage unit 234, via the data control unit 233, executes collation processing with the obtained registered user ID information, and in the event that the collation results are OK, an authentication OK is transmitted to the terminal of the user (game device 211) via the interface unit 231. In the event that the collation is not established, an error message is transmitted, prompting input of authentication data again.

The authentication processing is set to be executed a maximum number of times Nmax, and in step S121, the number of times of authentication processing is incremented (N=N+1) and compared with the maximum value (Nmax), and in the event that this has reached the maximum value (Nmax), there is the possibility of unauthorized access, so protection processing (S213) not permitting further input of passwords and the like is executed, and the processing ends.

In the event that the authentication is OK, the user authentication unit 232 obtains the character list via the data control unit 233 in step S105, and transmits the character list to the terminal of the user (game device 211), and the terminal device displays the received list on the display of the terminal. The user selects a character which he/she wants to use from the display character list (S106), and transmits the identifier (ID) of the selected character, security information with regard to the selected character, and further, necessary information such as item information and the like, to the character server 230.

The character server 230 executes authentication processing with regard to the security information for the selected character, at the user authentication unit 232. While steps S103 and S104 are authentication processing with regard to the user, step S108 is authentication for judging whether or not usage of the individual character is permitted, and password input, collation, etc., contained in the security information within the character information shown in FIG. 5 is executed.

With this authentication as well, as with the above-described user authentication, the authentication processing is set to be executed a maximum number of times Nmax, and in step S121, the number of times of authentication processing is incremented (N=N+1) and compared with the maximum value (Nmax) (S122), and in the event that this has reached the maximum value (Nmax), there is the possibility of unauthorized access, so protection processing (S213) not permitting further input of passwords and the like is executed, and the processing ends.

In the event that the authentication is established, the character server 230 transmits the selected character information to the terminal of the user (game device 211), and the user terminal (game device 211) receives the character information (S109).

Upon receiving the character information, the user terminal (game device 211) performs character information conversion processing to convert the form, texture, and material of the character into that matching the representational capabilities of the game device or that matching other characters and objects in the game, at the game program execution processing unit 223, and uses this as a character in the game to be executed by the game program execution processing unit 223.

Character information conversion processing is processing for converting the form, texture, and material of the character, into that matching the representational capabilities of the game device or that matching other characters and objects in the game. The form, texture, and material, of the characters or items in the character server 230 must be changed according to the representational capabilities of the game device itself or according to the quality of expression of the game world.

Character information conversion processing is processing for converting character information so that characters can be mutually used between many games and many game devices. For example, the number of polygons which can be used for expressing characters and items, the texture quality, and material parameters thereof, greatly differ between high-end arcade game devices and low-capability portable game devices. A method for solving this problem is to store high-quality character and item 3-D information (form, texture, and material) in the server, and to use this information to execute character information conversion processing within the game device.

Conversion of the form will be described. Generally, with 3-D games, 3-D objects are represented by polygon models. Accordingly, depending on the type of game or game device, reducing the number of polygons for the characters or items is very effective. Effectively reducing the number of polygons can be achieved by using the method disclosed in "Form Data Approximation Method, Information Processing Device, and Medium" (Japanese Patent Application No. 11-145471).

As for the texture, the size must be reduced since there are cases wherein, depending on the game device, the VRAM area is very small and large textures cannot be mapped. An example of a technique which can be used is image resolution lowering by mipmap (also known as MIP (multium in parvo) map) (Refer to "Pyramidal Parametrics" by Lance Williams (SIGGRAPH 1983 Proceedings)). Also, with computer graphics, the materials of objects are generally represented by material parameters such as diffusion, specular, refraction, etc., with these parameters being converted.

Further, in step S111, usage destination information registration processing is executed. This usage destination information registration processing is processing for notifying and registering the character usage destination information to be registered as character information in the character server 230, as described above with reference to FIG. 10, from the user terminal (game device 211) to the character server 230.

Figure 16:
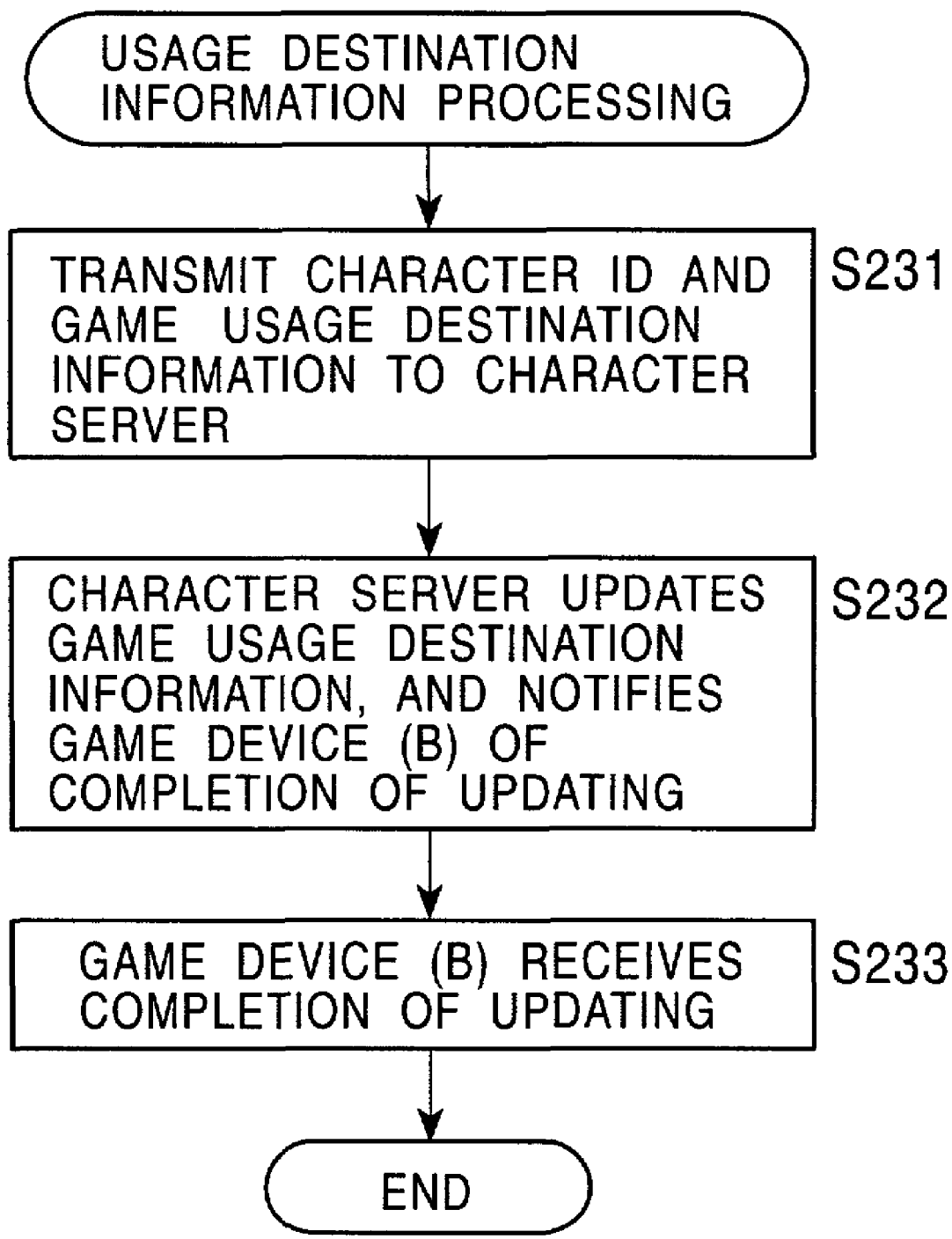
FIG. 16 is a flowchart describing the processing for registering usage destination information.

FIG. 16 shows a detailed processing flow for the usage destination information registration processing. First, in step S231, the user device terminal such as a game device or the like transmits information to the character server 230, this information being a character ID corresponding to the character obtained from the character server 230, and game usage destination information for the destination where the character will be featured, specifically, the network address of the network game server indicated by the data structure shown in FIG. 10, the network address of the game device which the character of the user is using, and further, as game information, a game identifier (ID), name of game, game company, and so forth.

Upon receiving the character ID and the game usage destination information from the user terminal (game device 211), the character server 230 updates the game usage destination information in the character information corresponding to the character ID, and upon completion of the updating processing, transmits an update completion notification to the game device 211 (S232), which the game device receives (S233), thereby ending the usage destination information registration processing.

Thus, the new character usage destination information is registered in the character server 230 of the characters being used, and other users who can view that information can determine which game the character is currently participating in by accessing the character server 230, so that other users can cause other characters to participate in that same game, for example.

[Uploading Character Information]

Figure 17:
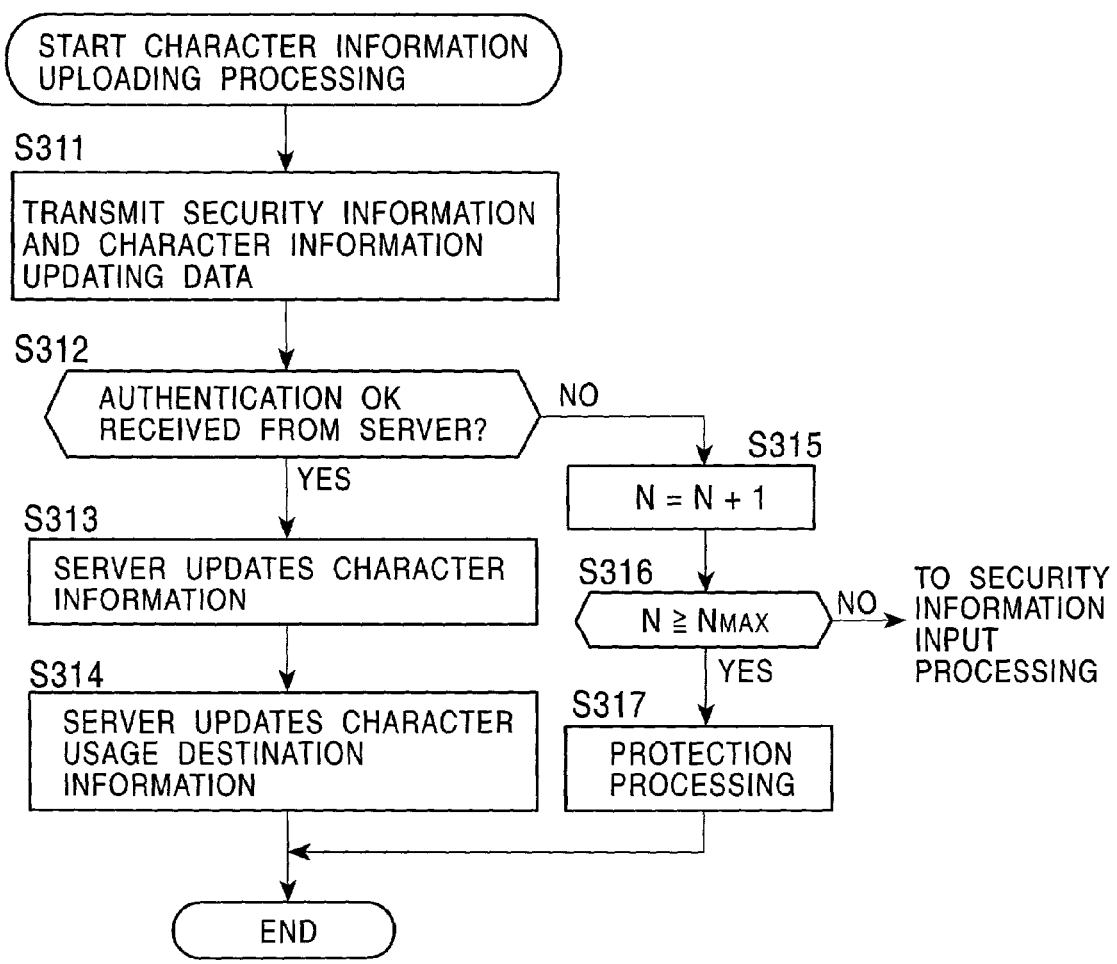
FIG. 17 is a flowchart describing the processing for uploading character information.

Next, the processing for returning character information from the user terminal to the character server 230, i.e., the processing for uploading character information, will be described. Normally, this task is performed during the game or at the time of ending the game. The processing for uploading character information will be described with reference to FIG. 2 and the flowchart in FIG. 17.

In the event of updating or adding character information on the character server 203 during the game or at the time of ending the game, such as updating capability values, the game program execution processing unit 223 within the game device 211 serving as a user terminal transmits the information item ID to be changed, and post-change parameter values, to the data transmission/reception unit 222. In response, the data transmission/reception unit 222 transmits the information item ID to be changed and post-change parameter values to the character server along with the encrypted security information which has been saved beforehand at the time of downloading the character, via the interface unit 221 (S311).

At the character server 230, the user authentication unit 232 receives the security information and update request via the interface unit 231, and requests and receives to and from the data control unit 233 reading out of the security information of the user registered in the storage unit. The user authentication unit 232 decodes the encryption of the security information, and makes a comparison thereof, thereby completing the authentication.

With this authentication as well, as with the above-described authentication, the authentication processing is set to be executed a maximum number of times Nmax, and in step S315, the number of times of authentication processing is incremented (N=N+1) and compared with the maximum value (Nmax) (S316), and in the event that this has reached the maximum value (Nmax), there is the possibility of unauthorized access, so protection processing (S317) not permitting further input of passwords and the like is executed, and the processing ends. Also, in the event that the authentication processing has not reached the maximum value Nmax, security information input processing is executed for the user to input security information again.

In the event that the authentication is OK (Yes in S312), the data control unit 233 receives the request for updating character information from the user authentication unit 232, and executes the updating processing (S313).

Further, in step S314, the character server 230 updates the character usage destination information (See FIG. 10) contained in the character information in the character server 230. In this case, in addition to "network address of network game server" and "network address of game device", "game information" such as "game ID", "game name", and "game company", is all rewritten to NULL, and a flag indicating whether the character is currently playing a game or not is prepared in the character usage destination information, and the flag is set to on or off.

Further, at a suitable time such as the time of ending the game or turning off the power in the case that the game device 211 is a home game device, the encrypted security information saved in the data transmission/reception unit 222 is erased.

[Character State Notification Processing]

Next, character state notification processing will be described following the flowchart shown in FIG. 18, with reference to a specific example. This will be described with reference to an example wherein a user B using a character B can tell whether or not the character A of the user A is currently playing a game, and if so, which game, by state notification processing.

We will assume that the character A has given permission to character B beforehand to notify its own state. The permission settings for this are executed by processing in the disclosure range information described earlier with reference to FIG. 11, wherein character B or a group including character B is set in the permitted character list in the disclosure range information of character A. The details of the disclosure range settings processing will be further described in the next section, which is "Setting the range of character information disclosure".

User B is a user which participates in games using the character B, and can know the state of the character A by the following flow, which will be described following the processing flowchart shown in FIG. 18. Note that the description will proceed assuming that the user B uses the game device 241 shown in FIG. 2 to execute processing for knowing the state of the character A.

Also, description will proceed under the assumption that characters including character A are registered in the earlier-described buddy character list of the character B as a buddy character (See FIG. 12), and that the user B which has the character B executes processing for obtaining all states of buddy characters including character A. As described above, a buddy character list is a list of buddy characters who disclose their information to the user having the list.

(1) The user B performs security information input processing with the game device (B) 241. The security information inputting processing is performed with the same method as described earlier with reference to FIG. 15; e.g., input of user ID, password, fingerprint, etc. One method is to input the character ID of the character which the user uses, and a password, to the game program execution processing unit 253, via the input device 255 of the game device (B) 241. An input screen example is shown in screen 1 in FIG. 19.

(2) The game program execution processing unit 253 of the game device (B) 241 receives the security information (character ID and password) of the character B input in (1) from the input device 255, and sends the security information and the buddy character state notification request to the data reception/transmission unit 252.

Figure 18:
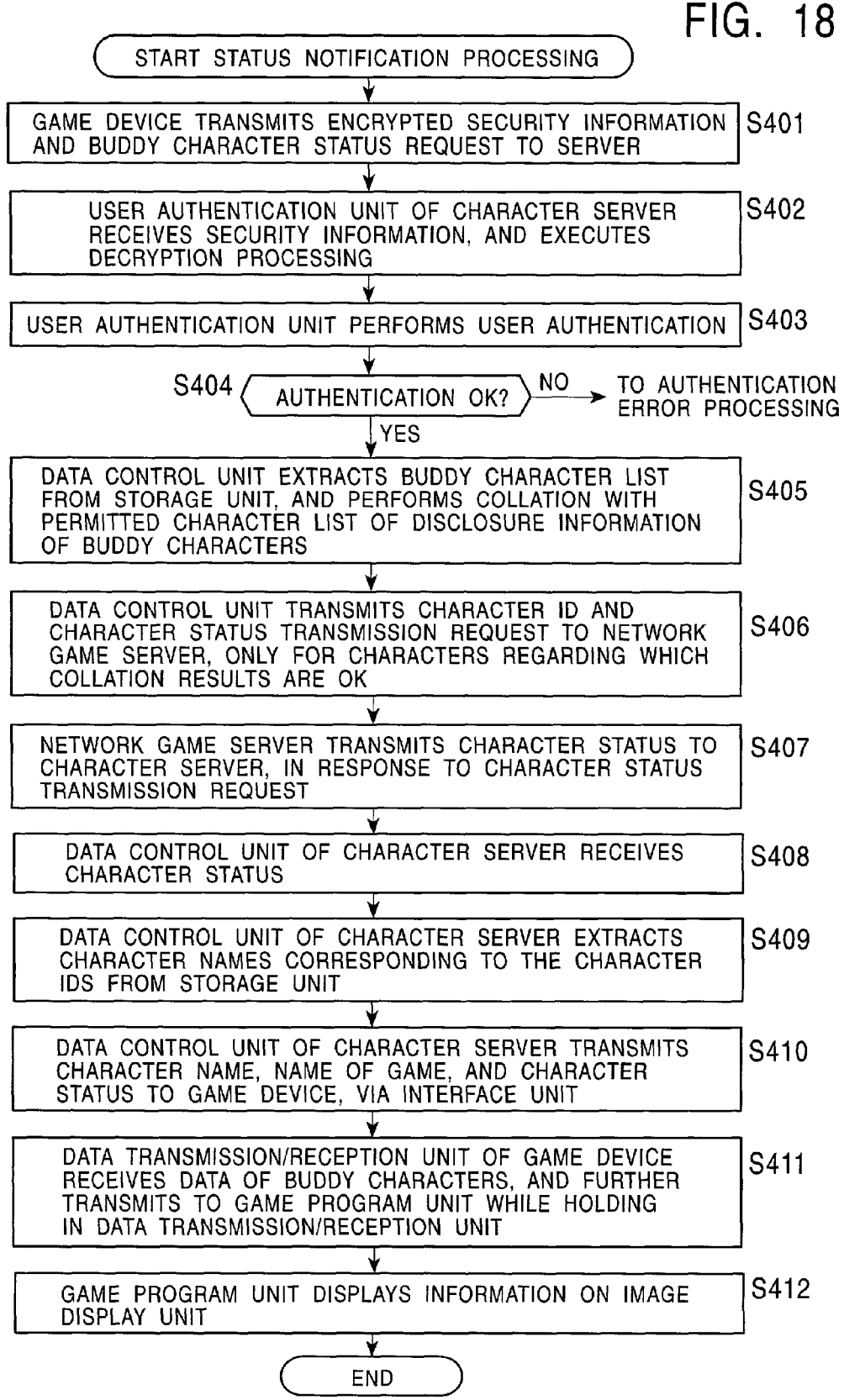
FIG. 18 is a flowchart describing the processing for notifying the state of a character.

(3) The data transmission/reception unit 252 encrypts the security information (character ID and password) of the character B, converts the buddy character state notification request to a request command for the character server, and transmits this to the character server 230 along with the encrypted security information, via the interface unit 251 of the game device (B) 241 (S401 in FIG. 18).

(4) The user authentication unit 232 of the character server 230 receives the security information via the interface unit 231 within the character server 230, and following the decryption processing (S402), uses the decrypted security information to perform user authentication (S403).

(5) In the event that the user authentication is OK, the data control unit 233 of the character server 230 receives the state notification request command for the buddy character, obtains the ID of the buddy character which the character B has from the storage unit 234, and further confirms that the character B is contained in the "permitted character list" within the "disclosure information" of the buddy characters, from the storage device 234 (S405). In the event that authentication is not established, authentication error processing is performed. That is, the user B is prompted to input authentication information again, within a maximum number of times set. Retrying input beyond the maximum number of times set is not permitted.

(6) In the event that authentication is OK, the data control unit 233 of the character server 230 obtains the disclosure range information (See FIG. 11) in the character information of the buddy character registered in the buddy character list that is contained in the character information of the character B, and executes collation regarding whether or not character B or a group containing character B is set in the permitted character list in the disclosure range information of character information for each of the buddy characters (S405).

The data control unit 233 of the character server 230 transmits the "character ID" and "character state" transmission request of the buddy character to the network game servers 201, 202, and 203, where the buddy characters are playing, only for the buddy characters regarding which collation is OK; i.e., buddy characters set to disclose the "character state" to character B (S406). Note that the addresses of the network game servers where the buddy characters are playing are obtained from the character usage destination information (See FIG. 10) in the character information of the buddy characters.

(7) The network game servers 201, 202, and 203, transmit "character state" to the character server 230, in response to the character state transmission request from the character server 230 (S407).

(8) The data control unit 233 of the character server 230 receives the "character state" from the network game servers 201, 202, and 203, via the interface unit 231, and obtains the "character ID" and corresponding "character state" (S408).

(9) The data control unit 233 of the character server 230 obtain the "character ID" and corresponding "character name" from the storage unit 234 (S409).

(10) The data control unit 233 of the character server 230 correlates the "buddy character list" (including character ID and character name) already stored in the character information of the character B, with the "state of buddy characters" received from the network game servers 201, 202, and 203, and transmits this to the game device (B) 241 via the interface unit 231 (S410).

(11) The data transmission/reception unit 252 of the game device (B) 241 receives the "buddy character list" and "state of buddy characters" via the interface unit 251 of the game device (B) 241, and hands this to the game program execution processing unit 253 (S411).

(12) The game program execution processing unit 253 displays the "buddy character list" and "state of buddy characters" via the image display unit 254 (S412). Screen 2 shown in FIG. 19 is this display, and in the event that the name of character A is, for example, "Linda", the user B can tell that the character A is in the state of playing the "Network RPG (A)" game, and currently "Fighting with a monster in So-and-So Forest".

The system according to the present invention embodies a system wherein characters held by the each user (player) can be used in network games or local games played on home game devices and the like, and in such an environment, each of the players would very much like to know where his/her buddy characters are currently playing games, and in what kind of state. For example, information can be obtained regarding which game a buddy in the same party in a role-playing game, or an opponent in the fighting game, is currently participating in, or whether the buddy is not participating in any game at all.

Once the player can tell the state of the buddy character (which game the buddy characters playing, and whether the buddy character can receive a message or not), the player can transmit a message to that character, according to the current state. Messages available here can be instantly notified to characters in play, and received messages can be saved in a message box for the character, to be confirmed later. Message transmission processing will be described later.

Combining the above-described character state notification and the later-described message transmission allows communication such as a player calling on others to participate in the game which he/she is currently participating, rendezvousing at network games, or encouraging characters in play.

[Character Information Disclosure Range Setting Processing]

Next, the processing for setting the disclosure range information in the character information will be described. The user (player) of each character is capable of setting how much of his/her character state to disclose to each character, and the range for disclosure, and groups for disclosure, can be specified.

Each character has disclosure range information within the character information in the character server, as described above with reference to FIG. 3. The "disclosure range information" has a "permitted character list" for permitting disclosure, for each piece of information to be disclosed, or each information group for disclosure as described earlier with reference to FIG. 11. The information of each character can be disclosed to characters regarding which disclosure is permitted beforehand, based on this disclosure range information. Each information group may have multiple information groups, such as information group 1, information group 2, and so forth. Also, the service provider of the character server may make several levels of information groups, ranging from very close friends to not-so-close, letting the users select the level and set groups.

In the example shown in FIG. 11, the information of "name of game being played" and "game state" are registered for the "information group 1", and characters regarding which the information of the "information group 1" is disclosed are held as a "character list" for each information group. Individual "character IDs" and "character groups" can be specified for the "character list". A "character group" is a group of characters registered in the character server, which is handy since buddies which have formed a character group can disclose information to buddy characters without specifying each individual character.

The flow for the user B using the character B giving permission to the character A for disclosure of information will be described following the processing flow shown in FIG. 20. Here, processing will be described for the user B using the character B permitting disclosure of information to the character A from the state of obtaining the information in screen 2 in FIG. 19 in the previous section [Character state notification processing].

(1) In screen 2 in FIG. 19, the user B selects the "Disclose Information" button through the input device 255 of the game device (B) 241.

Figure 20:
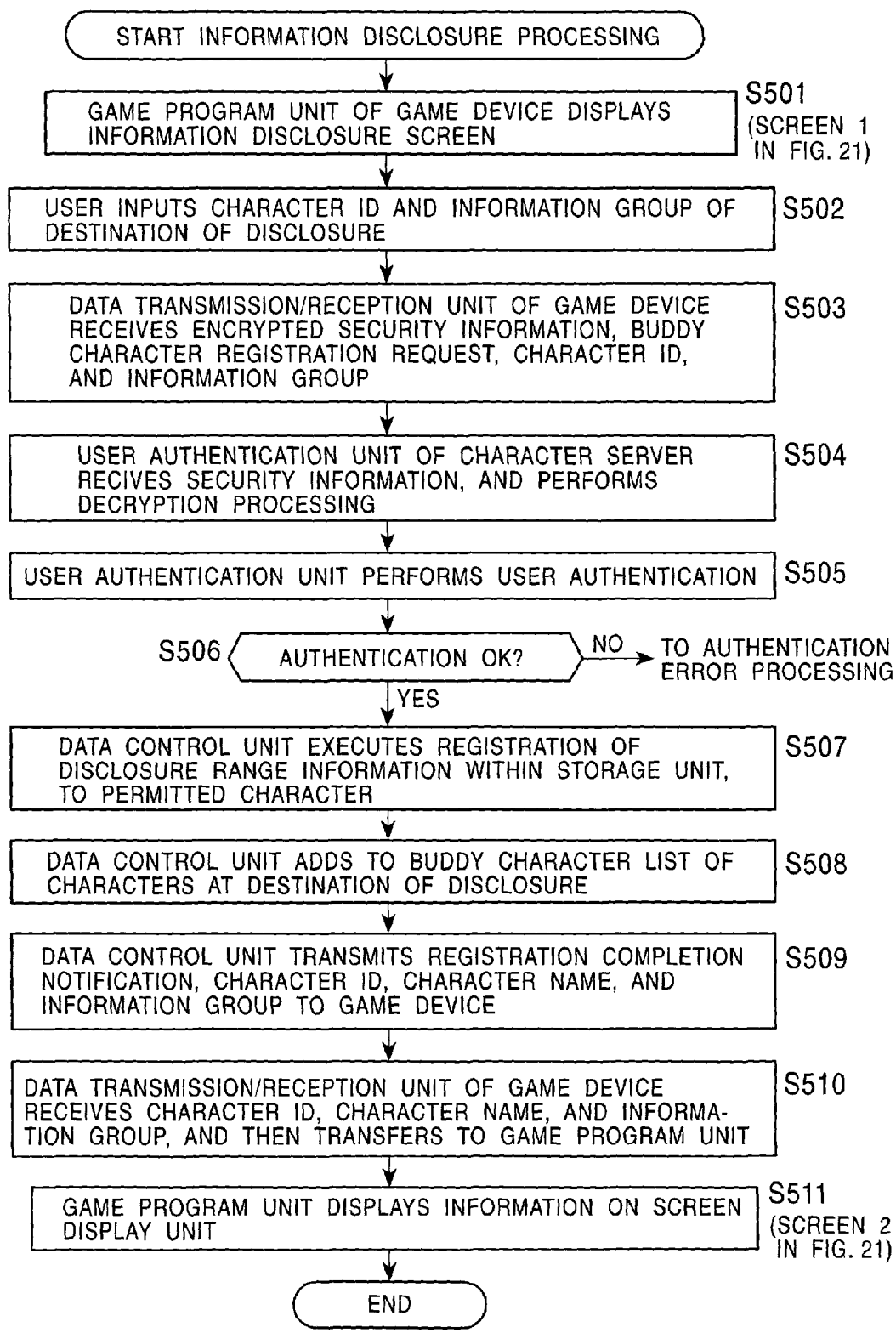
FIG. 20 is a flowchart describing the processing for setting the information disclosure range.
Figure 21:
FIG. 21 is a diagram illustrating an example of a screen displayed on the communication terminal of the user in the processing for setting the information disclosure range.

(2) The game program execution processing unit 253 of the game device (B) 241 displays the "information disclosure registration screen" shown in FIG. 21 (Screen 1) on the image display unit 254 (S501 in FIG. 20).

(3) The user B inputs the "character ID" of the character A to which he/she is to disclose his/her information, and the type of information to be disclosed ("information group") through the input device 255 of the game device (B) 241, which the game program execution processing unit 253 sends to the data transmission/reception unit 252.

(4) The data transmission/reception unit 252 transmits this to the character server 230 via the interface unit 251, along with the encrypted security information (character ID and password) of the character B already input in the previous section [Character state notification processing], that character registration request, and character ID of the buddy character and the type of information to be disclosed (information group) (S503).

Now, the character ID of the character to be a buddy may be obtained by exchanging information in conversation during a game beforehand. A better method is for characters in the same virtual space during the game to specify others for information disclosure, so as to perform registration of information to be disclosed with the character server 230.

(5) The user authentication unit 232 of the character server 230 receives the security information via the interface unit 231 of the character server 230, and following performing decryption processing (S504), uses the decrypted security information to perform user authentication (S505). In the event that the authentication is not established, authentication error processing is performed. That is to say, the user B is prompted to input authentication information again, within a maximum number of times set. Retrying input beyond the maximum number of times set is not permitted.

(6) In the event that the user authentication is OK, the data control unit 232 of the character server 230 receives the buddy character registration request command, and registers the character A as a "permitted character" with regard to the information group of the request for the character ID for registration in the "disclosure range information" (See FIG. 11) of the character B within the storage unit 234 (S507).

(7) Also, the data control unit 232 of the character server 230 sets the "new registration flag" of the "buddy character list" (See FIG. 12), for the buddy character (character A) which is the disclosure destination, to ON, and sets the "type of disclosure information" to ON for the type of information regarding which the character B has permitted for disclosure.

The processing for setting the "new registration flag" to ON is performed so that upon the character A connecting to the character server the next time, notification is made from the user of the character B to the user of the character A that information disclosure permission has been obtained, and the user of the character A confirms adding the character B to his/her own "buddy character list", thereby facilitating easy registration of the character B as a buddy character.

(8) Next, the data control unit 232 of the character server 230 transmits a "registration completion notification", the registered information "character ID" and "character name", and an "information group" indicating the type of information to be disclosed, to the game device (B) 241 via the interface unit 231 (S509).

(9) The data transmission/reception unit 252 of the game device (B) 241 receives the "character ID" and "character name" and "information group" via the interface unit 251 of the game device (B) 241, and hands this to the game program execution processing device 253 (S510).

(10) The game program execution processing unit 253 of the game device (B) 241 displays the registered "character ID" and "character name" and "information group" on the image display unit 254 (S511), notifying the user B of completion of registration. For example, a display such as shown in screen 2 in FIG. 21 is displayed on the image display device 254 of the game device (B) 241.

[Message Communication Processing]

Next, message communication processing between characters will be described. With the configuration according to the present invention, characters can mutually send messages even in the event that the characters are playing different games, for example, even in the event that the character A is participating in the fighting game provided by the network game server 201 shown in FIG. 2, and the character B is participating in a race game provided by the network game server 203 shown in FIG. 2. The path for transmitting messages in this case is: user communication terminal (game device) R character server R network game server (or game device).

Specifically, upon a message being created with the game device and transmitted, the message is sent to the character server, and following authentication of the originator (character) with the character server, the network game server (or game device) of the recipient is found in the database from the character ID of the recipient, and the message is transferred to recipient. The network game server or game device of the recipient confirms that the message is from a character server that has been registered beforehand (i.e., that is in a trust relation), and forwards the message to the recipient character.

An example of a case wherein a user B playing a game using the character B transmits the message to character A will be described following the processing flow in FIG. 22. The description will proceed under the understanding that the user B playing the game using the character B obtains the screen 2 in FIG. 19 described in the previous section, [Character state notification processing], and transmits a message to character A. Let us assume that the character A is playing a racing game with the network game server.

(1) In screen 2 in FIG. 19, the user B selects the "transmit message" button with the input device 255 of the game device (B) (241 in FIG. 2).

Figure 22:
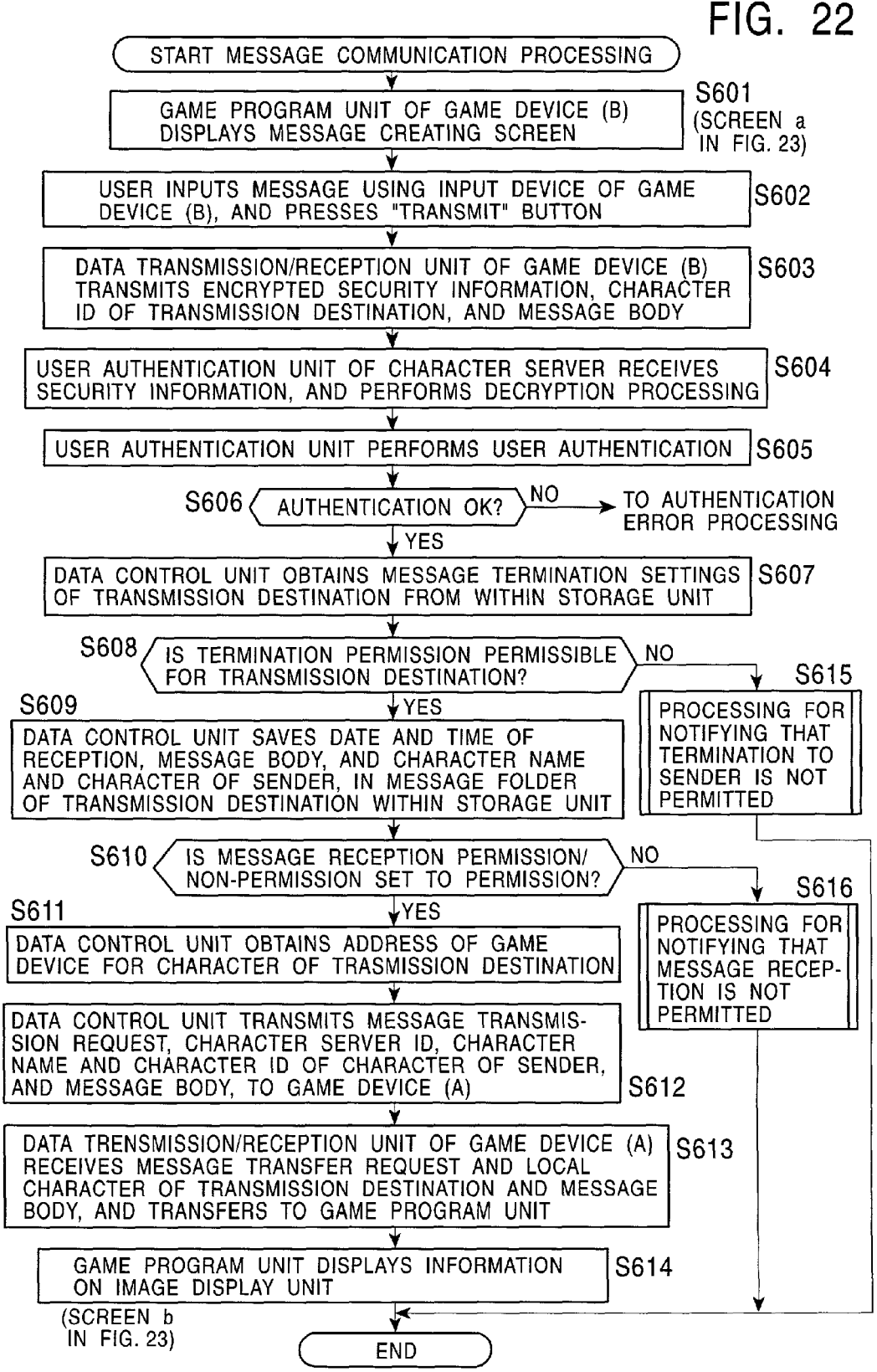
FIG. 22 is a flowchart describing the processing for transmitting a message.
Figure 23:
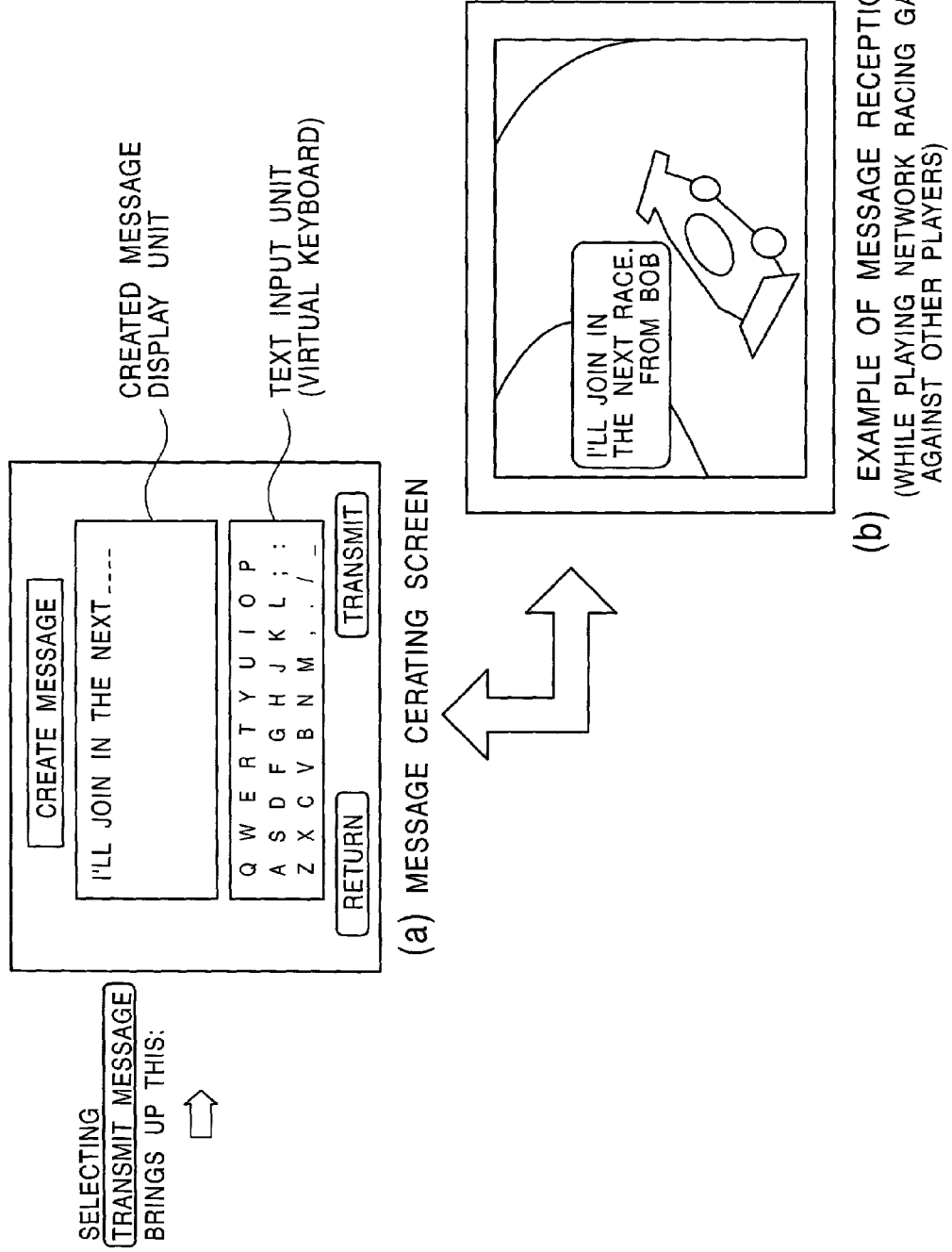
FIG. 23 is a diagram illustrating an example of a screen displayed on the communication terminal of the user in the processing for transmitting a message.
Figure 24A:
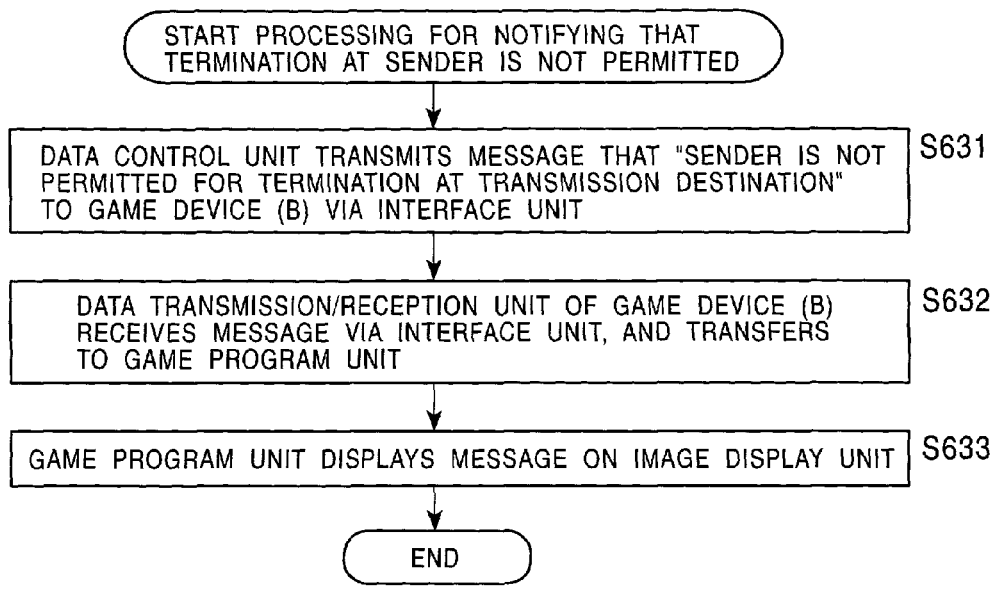
FIG. 24 is a flowchart describing the processing for making settings for non-permission of termination and non-permission of reception in the message transmission processing.

(2) The game program execution processing unit 253 of the game device (B) 241 displays a "message creating screen" such as shown in FIG. 24A on the image display unit 254 (S601 in FIG. 22).

(3) The user B inputs a message to the character A from the input device 255 of the game device (B) 241 using the "text input unit (a virtual keyboard unit)" of the image display unit 254, the game program execution processing unit 253 interprets the input from the input unit and judges which characters have been input, and displays the input message on the "created message display unit" of the image display unit 254. In the event that the input device 255 has text input capabilities, the text input may be executed through the input device 255, and in the event that a keyboard can be connected, for example, this may be executed through the keyboard. Also, in the event that a user communication terminal is capable of text input as with a cellar telephone, the text input functions thereof are used.

(4) Upon completing message input, the user B presses the "transmit" button on the input device 255 (S602), which causes the data transmission/reception unit 246 of the game device (B) 241 to transmit the encrypted security information (character ID and password) input in the previous section, [Character state notification processing] and the "character ID" of the destination character A and the "message body", to the character server 230 via the interface unit 251 (S603).

(5) The user authentication unit 232 of the character server 230 receives the security information via the interface unit 231 within the character server 230, and performs decryption processing, following which the decrypted security information is used to perform user authentication. In the event that the authentication is not established, authentication error processing is performed. That is to say, the user B is prompted to input authentication information again, within a maximum number of times set. Retrying input beyond the maximum number of times set is not permitted.

(6) In the event that the user authentication is OK, the data control unit 233 of the character server 230 searches the storage unit 234 based on the "character ID" information of the message destination, and obtains the "character usage destination information" of the destination character A. The "character usage destination information" of the character A is contained in the character usage destination information of the character information of the character A (See FIG. 10).

(7) Next, the data control unit 233 of the character server 230 obtains message termination settings information (See FIG. 13) contained in the character information of the character A (S607), and judges whether or not the "termination permission" of the character A is set to "permitted" for character B (S608). In the event that the settings are "permitted", the "date and time of reception" and "message body" and "sender (character name and character ID)" are saved in a "message folder" of the character A within the storage unit (S609).

In the event that "termination permission" in the message termination settings information contained in the character information of the character A are "not permitted" with regard to the sending character B, "Processing for notifying that termination to sender is not permitted" (S615) is performed, and the present processing is ended without performing any further processing.

The "Processing for notifying that termination to sender is not permitted" (S615) will be described with reference to FIG. 24A. First, the data control unit 233 of the character server 230 transmits a message to the game device (B) 241 via the interface unit 231 to the effect that "Sender is not permitted for termination at transmission destination" (S631). Next, the data transmission/reception unit 252 of the game device (B) 241 receives the message via the interface unit 251, transfers this to the game program execution processing unit 253 (S632), and the game program execution processing unit 253 displays the message on the image display unit 254 (S633).

(8) Next, the data control unit 233 of the character server 230 judges the settings of "message reception permission/non-permission" in the message termination setting information contained in the character information of the character A (S610), and in the event that the setting is "permitted", the data control unit 233 finds the network address of the game device (A) 211 which the game device in which the character A is being played (S611), and transmits to the game device (A) 211, a "message reception request", "character server ID", "sender character information" (character ID, character name, etc.), and "message body", via the interface unit 231 (S612). Note that the network address of the game device (A) 211 is obtained from the character usage destination information (See FIG. 10) in the character information of the character A.

In the event that the settings of the "message reception permission/non-permission" are "not permitted" in the message termination settings information contained in the character information of the character A, a "Processing for notifying that message reception is not permitted" (S616) is performed, and the present processing is ended without performing any further processing.

The "Processing for notifying that message reception is not permitted" (S616) will be described with reference to FIG. 24B. First, the data control unit 233 of the character server 230 transmits a message to the game device (B) 241 via the interface unit 231 to the effect that "Transmission destination does not currently permit reception of messages" (S651). Next, the data transmission/reception unit 252 of the game device (B) 241 receives the message via the interface unit 251, transfers this to the game program execution processing unit 253 (S652), and the game program execution processing unit 253 displays the message on the image display unit 254 (S653).

(9) In the message termination settings information contained in the character information of the character A, in the event that the settings of the "message reception permission/non-permission" judgment (S610) in the message termination setting information contained in the character information of the character A are "permitted", the data transmission/reception unit 222 of the game device (A) 211 receive the "message transfer request", "local character ID" of the destination, and the "message body", via the interface unit 221, and transfers this to the game program execution processing unit 223 (S613).

Figure 24B:
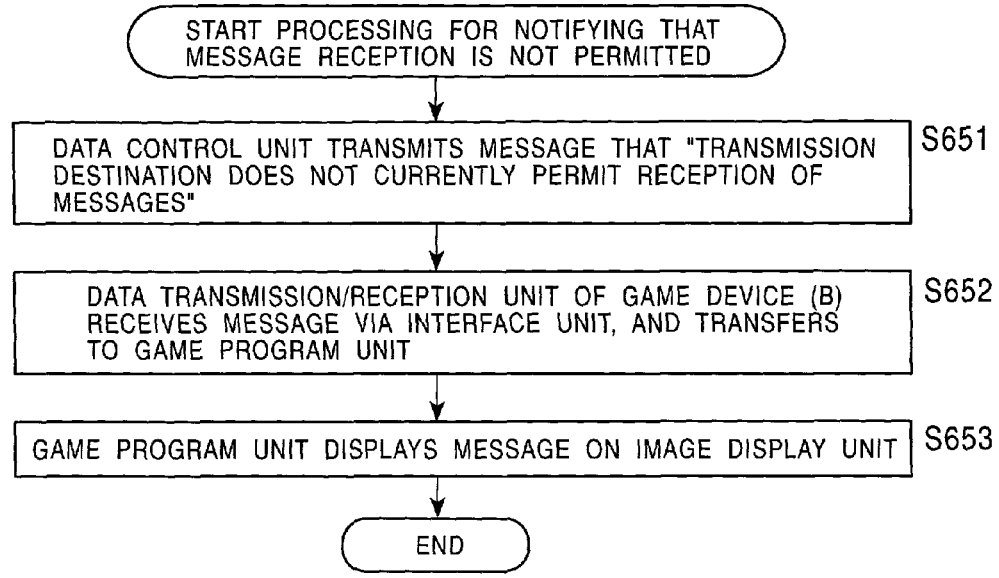

(10) The game program execution processing unit 223 of the game device (A) 211 displays the message on the image display unit 224 (FIG. 24B). In this example, the message reaches the character A playing the network racing game, and is displayed.

In this way, with the system according to the present invention, the state of buddy characters can be viewed at a glance on the image display unit of the game device (Screen 2 in FIG. 19), and there is a link to the message transmitter for transmitting messages to buddy characters on the screen, thereby enabling message transmission.

As described above, combining character state notification and message transmission allows messages to be transmitted according to the current state. Messages available here can be instantly notified to characters in play, and received messages can be saved in a message box for the character, to be confirmed later.

[Game Participation Processing]

Next, the processing for newly participating in the game in which other characters are participating, will be described. As described earlier, with the configuration according to the present invention, players can know the state of the other characters, and in the event that the player has interest in that game, the player can execute processing for new participation of his/her own registered character.

Figure 25:
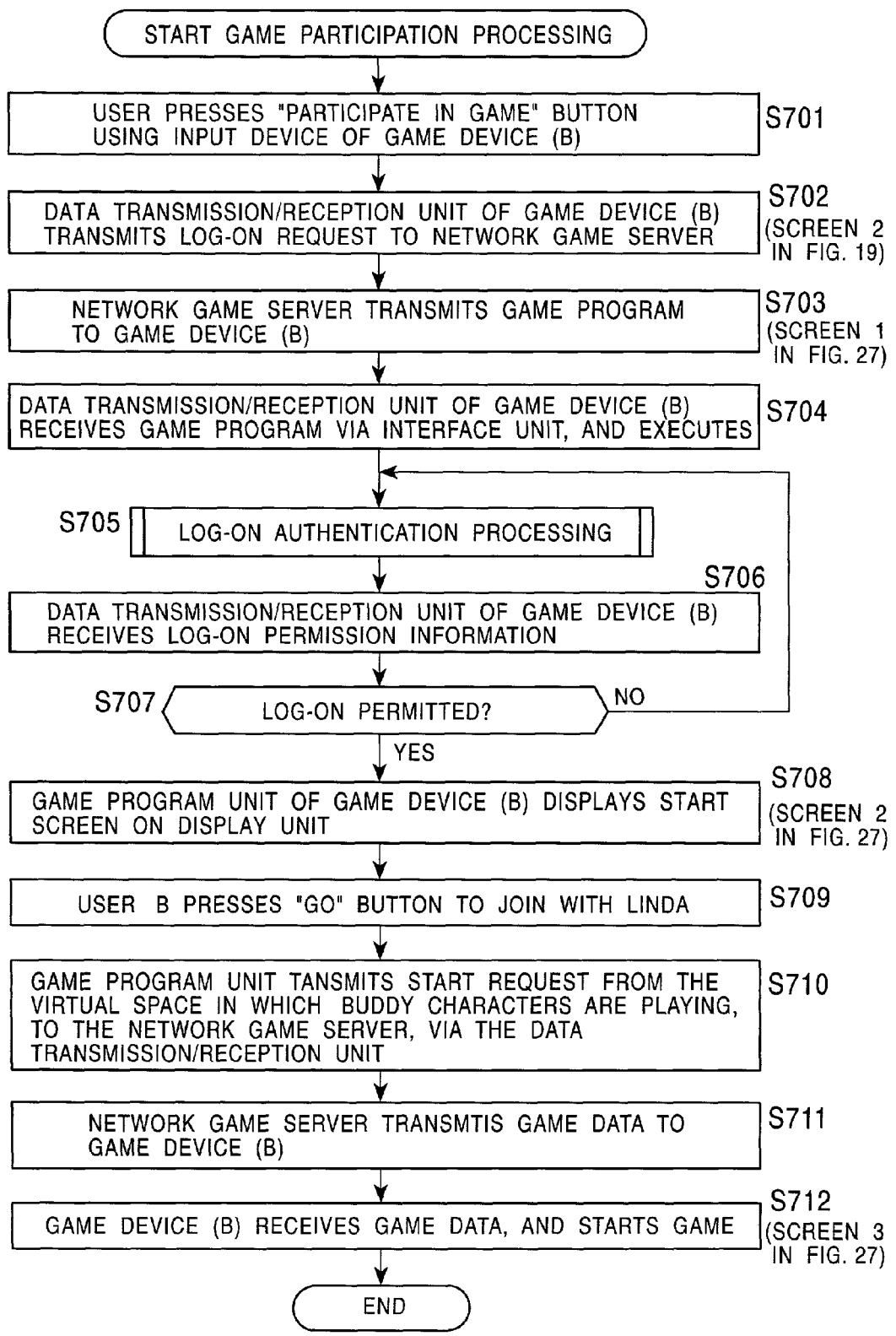
FIG. 25 is a flowchart describing the processing for participating in a game.

The following is a description of the game participation processing, following the flowchart shown in FIG. 25. Here, description will be made regarding an example wherein the user B obtains the screen 2 in FIG. 19 described in the previous section, [Character state notification processing], and presses the "game participation button" from the screen 2 in FIG. 19, thereby joining up with the buddy character (Linda) in the network RPG.

(1) In screen 2 in FIG. 19, the user B selects the "Participate in game" button set in the area corresponding to the character (Linda) with the "input device" of the game device (B) 241 (S701).

(2) The data transmission/reception unit 252 of the game device (B) 241 shown in FIG. 2 transmits a log-on request to the network game server (A) 201 providing the network RPG which the character (Linda) is participating in (S702).

(3) The network game server (A) 201 transmits a "game program" corresponding to the network RPG in which the character (Linda) is participating to the game device (B) 241 (S703).

(4) The data transmission/reception unit 252 of the game device (B) 241 receives the "game program" via the interface unit 251, and the game program execution processing unit 253 executes the "game program" (S704).

(5) The game program is executed within the game device (B) 241, and communication is performed with the network game server (A) 201 to execute log-on authentication processing (S705).

Log-on processing is procedures executed between the network game server and the user terminal (game device) for participating in a game provided by the network game server. The log-on processing will be described with reference to the flowchart shown in FIG. 26 and the display screen example shown in FIG. 27.

Figure 26:
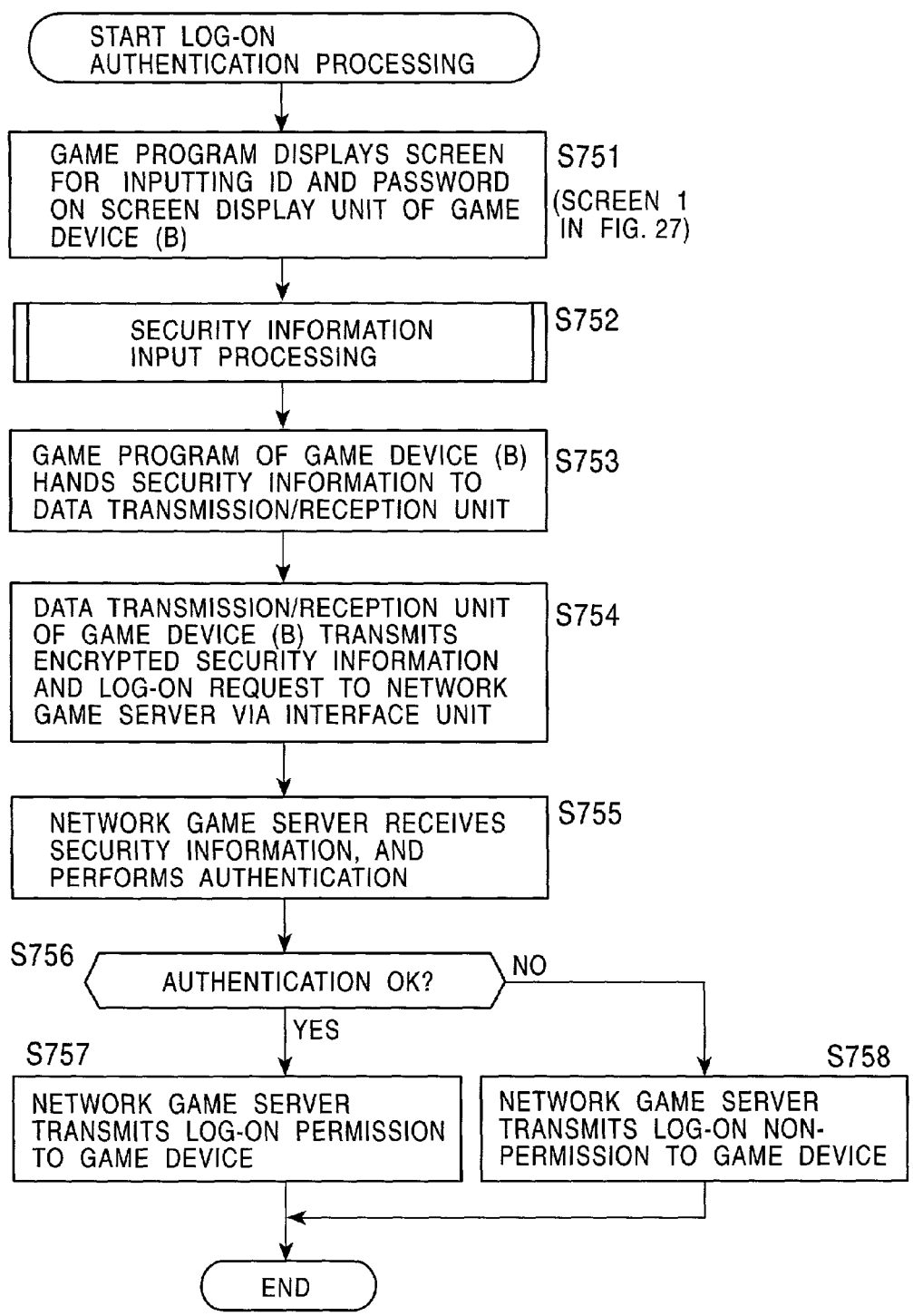
FIG. 26 is a flowchart describing log-on processing.
Figure 27:
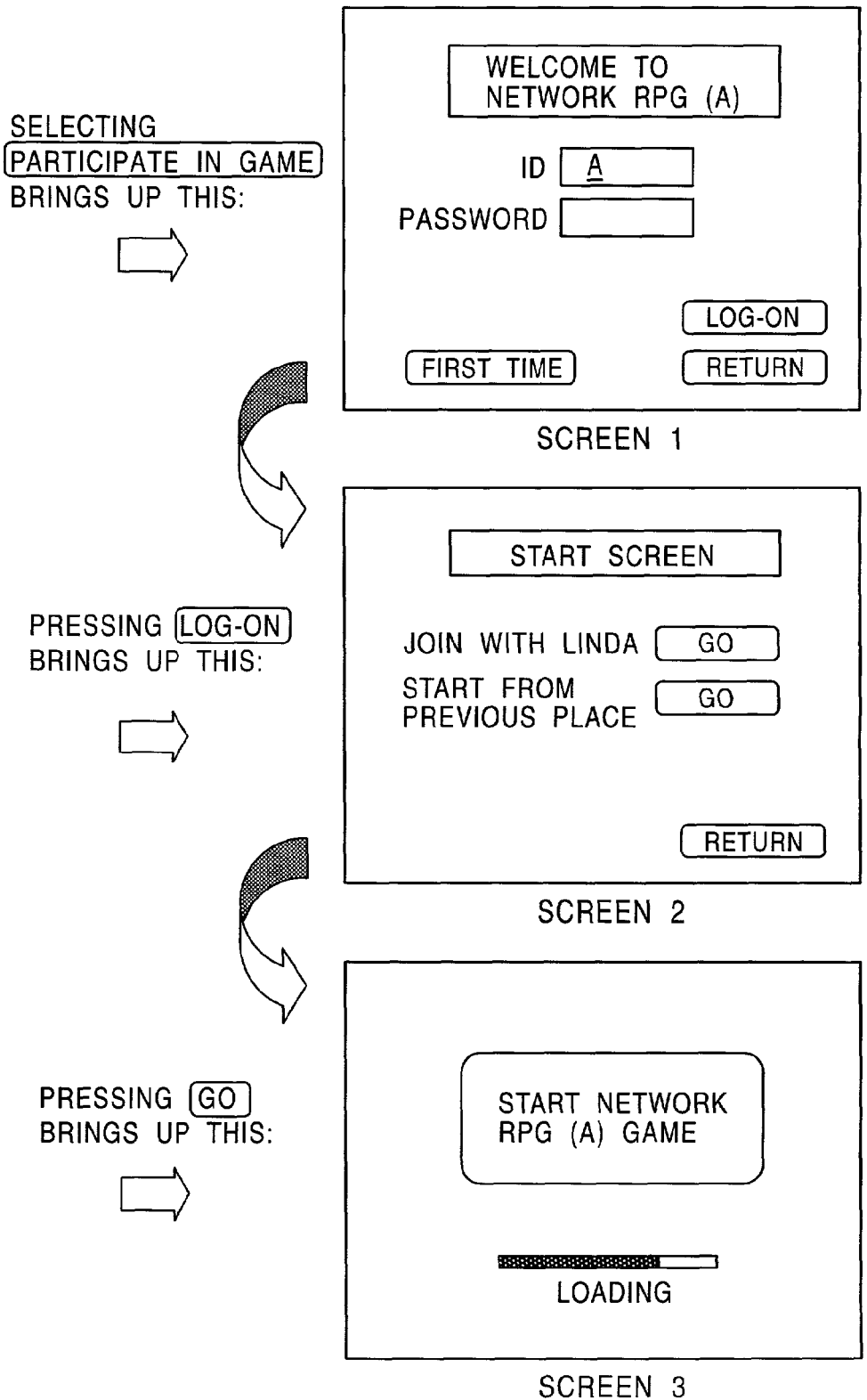
FIG. 27 is a diagram illustrating an example of a screen displayed on the communication terminal of the user in the processing for participating in a game.

A user who wants to participate in a game provided by a network game server executes access to the network game server, whereby the log-on request screen shown in FIG. 27 (Screen 1) is displayed on the image display unit of the game device (S751 in FIG. 26).

The user input security information in the log-on request screen shown in FIG. 27 (Screen 1), such as pre-registered user ID, password, etc. (S752). Such security information is information set by agreement between the network game server and the user terminal (game device), and may be set to input information such as fingerprints and the like, as well.

The game program execution processing unit 253 of the game device (B) 241 hands the security information to the data transmission/reception unit 252 (S753). Next, the data transmission/reception unit 252 of the game device (B) 241 transmits the encrypted security information and log-on request to the network game server (A) 201 via the interface unit 251 (S754).

Next, the network game server (A) 201 receives the security information, and performs authentication (S755). Authentication is processing for judging whether or not the pre-registered user ID, password, etc., agree with the received data.

In the event that authentication is established, the network game server (A) 201 transmits a log-on permission to the game device (B) 241 (S757). In the event that authentication is not established, the network game server (A) transmits a log-on non-permission to the game device (B) 241 (S758).

Let us continue with the description with the flowchart in FIG. 25.

(6) Following the log-on processing shown in FIG. 26, the data transmission/reception unit 252 of the game device (B) 241 receives the "log-on permission information" (S706).

(7) In the event that log-on is permitted (Yes in S707), the game program execution processing unit 253 of the game device (B) 241 displays the start screen of the game on the image display unit 254 (S708) (Screen 2 in FIG. 27).

(9) In screen 2 shown in FIG. 27, the user B presses the "GO" button for "Join with Linda" (S709).

(10) The game program execution processing unit 253 of the game device (B) 241 transmits a game start request from the point at which Linda is playing, to the network game server (A) via the data transmission/reception unit 252 (S710).

(11) The network game server (A) 201 transmits the requested game data to the game device (B) 241 (S711) (Screen 3 in FIG. 27).

(12) The data transmission/reception unit 252 of the game device (B) 241 receives the game data via the interface unit 251, and the game program execution processing unit 253 starts the game based on the "game data".

Due to the above processing, the user B having the character B can join with the buddy character (Linda) in the network RPG.

Thus, with the system according to the present invention, players can confirm the state of buddy characters in the form of a list on the image display unit of the game device (Screen 2 in FIG. 19), and there are links for participating in the games with buddy characters on that screen, so the player can easily move to the virtual space where his/her own buddy character is in the event of participating in a multi-player network game that a buddy character is currently playing.

For example, with the network RPG in which multiple players can participate, a player can experience adventures with buddy characters in a vast virtual space, but simply knowing which game a buddy characters participating in, and participating in that game, is insufficient unless the player can meet the buddy character. Also, with an example of a baseball game having multiple ballparks in a virtual space, the player cannot enjoy the baseball game with his/her buddy character unless he/she can tell which ballpark the buddy player is playing in. With the system according to the present invention, information regarding which game the character is participating in is stored in the character server, and information regarding wherein the game the character currently is, is obtained by communication between the network game server and a character server, so the player can move to the virtual space where the buddy character is playing using that information.

In this way, with the configuration according to the present invention, characters can participate in games and join in with buddy characters over a number of network games, by the character server having information regarding which game buddy players are currently playing.

[The Series of Processes at the Communication Terminal Device]

Figure 28:
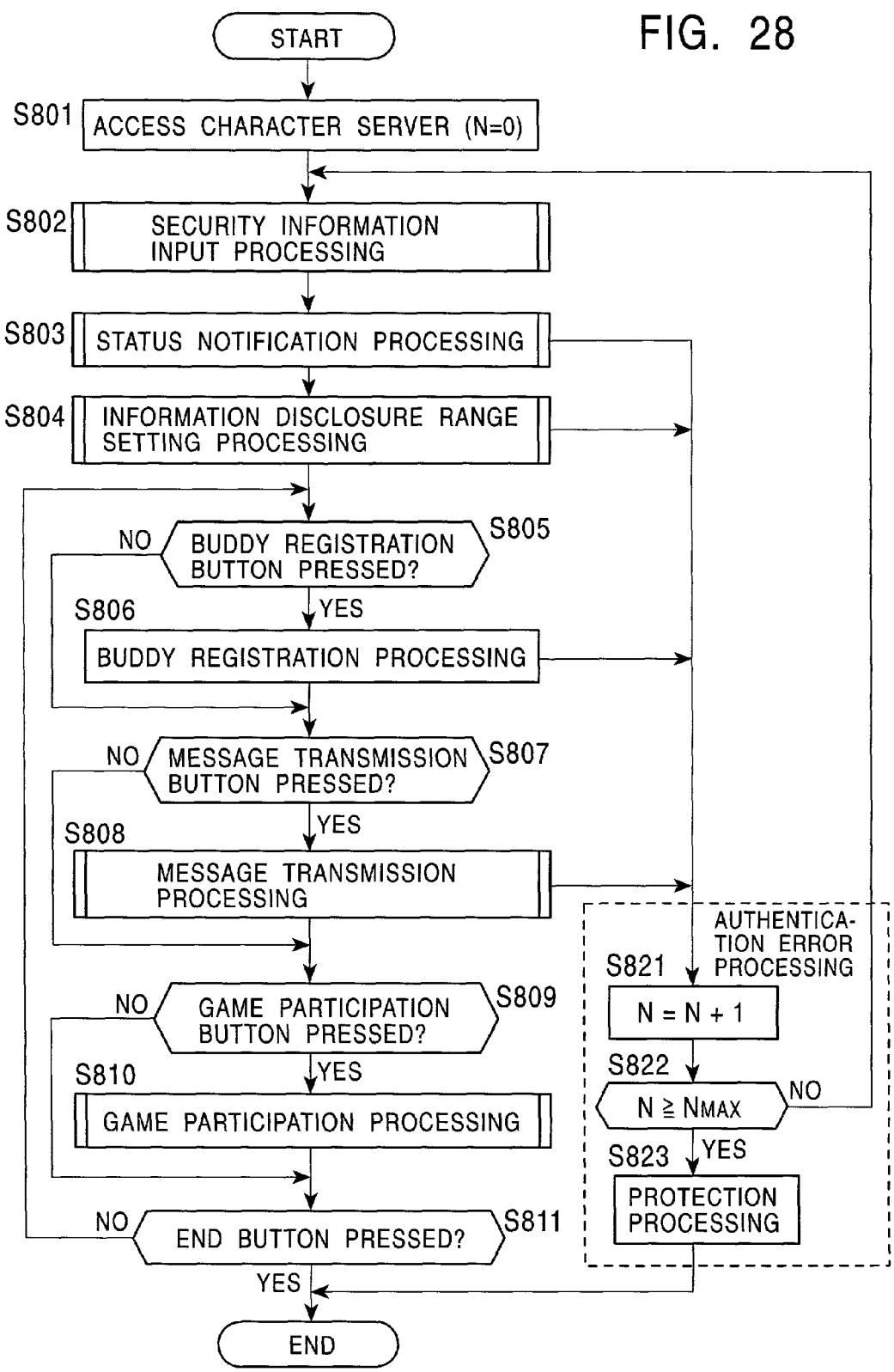
FIG. 28 is a flowchart describing an example of processing executed at the communication terminal (game device) of a user.

The description so far has been each process executed by the character data managing system according to the present invention, described individually. Now, FIG. 28 is a flowchart illustrating the overall processing for the user terminal device (game device) access the character server and participate in the game in which other characters are participating. It should be noted that the processing example shown in FIG. 28 is an example of a processing sequence executed at a game device, and processing following other sequences may be executed as well.

Description will be made regarding each step of the flowchart shown in FIG. 28. First, in step S801, the user communication terminal (e.g., the game device (A) 211 shown in FIG. 2) accesses the character server 230 via the interface unit 221. The character server 230 prompts the user to input security information. The user executes input of user ID, password, fingerprint, etc., (S802), and transmits the encrypted data thereof to the character server 230. The input of this security information is the processing described with reference to FIG. 15 earlier.

Next, the user executes state notification processing of his/her own character (S803). A character A is capable of processing for notifying other characters of his/her state. This is the [Character state notification processing] described with the processing flowchart in FIG. 18.

Next, the user executes information disclosure range settings processing for his/her own character (S804). Each character user (player) can set which characters to tell the state of his/her own character, for each character, and the range in groups of characters for disclosure can be specified. This is the [Character information disclosure range setting processing] described with the processing flowchart in FIG. 20.

As described above, with the "Character information disclosure range setting processing", buddy registration of other characters can be performed. The buddy registration processing is executed by displaying the "information disclosure registration screen" shown in FIG. 21 (Screen 1) on the display unit, and pressing the registration button.

In the "information disclosure registration screen" shown in FIG. 21 (Screen 1), pressing the registration button executes the buddy registration processing (S806), and updating of the disclosure range information shown in FIG. 11 and the buddy character list shown in FIG. 12, within the character information in the character server, is executed.

The user obtains the status of buddy characters from the character server, displays the screen shown in FIG. 19 (Screen 2), and can execute message transmission processing (S807 and S808). This is performed by the [Message communication processing] described with the processing flowchart shown in FIG. 22 earlier, by pressing the message transmission button in the screen shown in FIG. 19 (Screen 2). The path for transmitting messages is: user communication terminal (game device) R character server R network game server (or game device).

Further, the user can obtain the status of buddy characters from the character server, display the screen shown in FIG. 19 (Screen 2), and execute game participation processing (S809 and S810). Pressing the game participation button in the screen shown in FIG. 19 (Screen 2) executes the [Game participation processing] described earlier with the processing flowchart shown in FIG. 25.

Thus, various types of processing are executed, and the processing ends by the user pressing the end button on the game device.

Also, authentication processing is executed between the character server and the user terminal in the state notification processing in step S803 (See FIG. 18), the information disclosure range setting processing in step S804 (See FIG. 20), the buddy registration processing in step S806, the message transmission processing in step S808 (See FIG. 22), etc. In each of the authentication processes, the user ID, password, fingerprint data, etc., for example, input in the security information input processing in FIG. 15 described earlier, is transmitted from the user terminal to the character server, and collation with the security information which the character server side has already obtained, is executed. In the event that the authentication is not established, authentication error processing is performed. That is to say, the user is prompted to input authentication information again, within a maximum number of times set. Retrying input beyond the maximum number of times set is not permitted (S821 through S823).

Thus, with the system according to the present invention, each game player can have his/her own character in the character server, and thereby cause the character to be featured in multiple games. Also, in addition to the appearance of the character, attributes of the character and items which the player have can be shared, thus achieving a new form of enjoyment in gaming. Also, characters of different players can notify characters of players within a range permitted beforehand regarding their own locations in different games or different virtual spaces, and can send messages one to another, which is greatly advantageous with regard to communication within teams or between competing players in network games, thereby providing the players with a new form of enjoyment that has not existed in conventional game systems.

Now, the present invention has been described in detail with reference to a particular embodiment. However, it is self-evident that one skilled in the art can make various modifications and substitutions to the embodiment without departing from the scope or spirit of the present invention. In other words, the present invention has been disclosed in the form of an example, and the embodiment should not be interpreted restrictively. The scope of the present invention is to be determined solely by the claims given at the beginning.

The above-described series of processing can be executed by hardware, software, or a combined configuration of the two. In the event of executing the processing with software, the program making up the software may be installed in the memory of a computer having dedicated hardware built in, and executed, or may be installed in a general-purpose personal computer capable of executing various functions.

For example, the program may be recorded in a hard disk or ROM (Read-Only Memory) beforehand. Or, the program may be temporarily or permanently stored (recorded) on removable recording media, such as a floppy disk, CD-ROM (Compact Disc Read-Only Memory), MO (magneto-optical) disk, DVD (Digital Versatile Disk), magnetic disk, semiconductor memory, etc. Such a removable recording medium can be provided as a so-called packaged medium.

Also, besides being installed from such a removable recording medium to a computer, the program may be transferred from a download site to the computer in wireless or cable fashion via a network such as a LAN (Local Area Network) or the Internet, with the computer receiving the program transferred thus and installing the program in a built-in hard disk or like recording medium.

Now, the various types of processing described in the specification may be performed in a time-sequence following the described order, or may be executed in parallel or independently according to the processing capabilities of the device executing the processing, or as depending on need. Also, in the present specification, the term "system" represents the logical collective configuration of multiple devices, and each of the component devices may or may not be within the same housing.

Thus, as described above, with the character data managing system, character server, character data managing method, and program, according to the present invention, characters set corresponding to each user are registered in a character server, and the characters can be downloaded from the character server and featured in various types of game programs, thereby providing the players with a new form of enjoyment.

Also, with the system according to the present invention, characters of different players can notify characters of players within a range permitted beforehand regarding their own locations in different games or different virtual spaces, and can send messages to one another, which is greatly advantageous with regard to communication within teams or between competing players in network games, thereby providing the players with a new form of enjoyment that has not existed in conventional game systems.

Further, with the character data managing system, character server, character data managing method, and program, according to the present invention, in addition to the appearance of the character, attributes of the character and items which the player have can be shared, thus achieving a new form of enjoyment in gaming.

In sum, although the present invention has been described with reference to specific embodiments, those of skill in the art will recognize that changes may be made thereto without departing from the spirit and scope of the present invention as set forth in the hereafter appended claims.

The invention claimed is:

1. A character data managing system managing character data displayed on a communication terminal device, the character data managing system comprising:
   a character server storing:
   (a) a plurality of characters, and
   (b) a plurality of character information, wherein each of the plurality of character information is associated with one of the plurality of characters;
   wherein each of said plurality of character information associated with a character stored in the character server contains:
   (a) a first type of information regarding the associated character;
   (b) a second type of information regarding the associated character, wherein said first type of information is different from said second type of information; and
   (c) information disclosure settings information that sets which of the plurality of characters stored in the character server the first type of information is disclosable to and which of the plurality of characters stored in the character server the second type of information is disclosable to,
   communication terminal devices capable of downloading, from the character server, at least one of the plurality characters, wherein each of the characters are downloadable for use in multiple types of game programs executable at the communication terminal devices and wherein the characters act on behalf of a plurality of users in the game programs, and
   wherein the character server transmits, to a communication terminal device using a first character in one of the game programs, at least one of (i) a first type of information associated with a second character and (ii) a second type of information associated with the second character according to an information disclosure settings information associated with the second character.

2. The character data managing system of claim 1, further comprising a game server for providing said multiple types of game programs executable at the communication terminal devices;
   wherein each of the communication terminal devices further comprises game program execution processing parts for downloading a character registered in the character server to the respective communication terminal device and executing a game provided by the game server featuring the downloaded character.

3. The character data managing system of claim 1, wherein said information disclosure settings information within character information stored in the character server contains character usage destination information;
   wherein the character usage destination information includes an address of a communication terminal device currently using a character;
   and wherein the character server executes processing for disclosing the address to another character, with character information being registered in one of the character server and another character managing user.

4. The character data managing system of claim 1, wherein said information disclosure settings information within character information stored in the character server contains character usage destination information;
   wherein the character usage destination information includes an address of a network game server currently using a character;
   and wherein the character server executes processing for disclosing the address to another character, with character information being registered in one of the character server and another character managing user.

5. The character data managing system of claim 1, wherein said information disclosure settings information within character information stored in the character server contains disclosure range information;
   wherein the disclosure range information includes data correlating disclosure range information within character information and disclosure destination character information;
   and wherein the character server executes processing for disclosing the character information to another character, with character information being registered in one of the character server and another character managing user, following setting conditions of the disclosure range information.

6. The character data managing system of claim 1, wherein said information disclosure settings information within character information stored in the character server contains a buddy character list;
   wherein the buddy character list includes other character information data to which character information is disclosable;
   and wherein the character server executes processing for disclosing the character information to another character, with character information being registered in one of the character server and another character managing user, following character conditions registered in the buddy character list.

7. The character data managing system of claim 1, wherein the said information disclosure settings information within character information stored in the character server includes message termination settings information;
   wherein the message termination settings information includes settings data regarding the permissibility of respective reception and termination of messages from another character wherein character information is registered in one of the character server and another character managing user;
   and wherein the character server executes processing for transmission of a message from another character wherein character information is registered in one of the character server and another character managing user, following the message termination settings information.

8. The character data managing system of claim 1, wherein the character server executes authentication processing to a respective communication terminal device and executes data transmission to the communication terminal device when authentication is established.

9. The character data managing system of claim 1, wherein the character server obtains character usage destination information from character usage destination information within character information corresponding to a buddy character based on buddy character identification data registered in the character information, in response to reception of a character state transmission request from a respective communication terminal device, and executes processing for transmitting a character status, obtained by inquiry to the obtained character usage destination information, to the communication terminal device which made the character state transmission request.

10. The character data managing system of claim 1, wherein the character server obtains character usage destination information from character usage destination information within character information corresponding to a buddy character based on buddy character identification data registered in the character information, in response to reception of a character state transmission request from a respective communication terminal device, and executes processing for transmitting the character status obtained by inquiry to the obtained character usage destination information, and address information of a game server providing a game program in which the buddy character is participating, to the communication terminal device which made the character state transmission request.

11. The character data managing system of claim 10, wherein the communication terminal device executes access to the game server following address information of the game server providing the game program in which the buddy character obtained from the character server is participating, and executes game participation processing of own character obtained by downloading from the character server.

12. The character data managing system of claim 10, wherein the game participation processing includes an interface having at least one game participation button in an area corresponding to at least one user participating in the game.

13. The character data managing system of claim 1, wherein a user features a character in a game provided by a network game server.

14. The character data managing system of claim 1, wherein each of the communication terminal devices converts a form, a texture, and a material associated with a downloaded character into a matching form, a matching texture, and a matching material associated with other characters in the game program.

15. A character server for managing character data to be displayed on a communication terminal device, the character server comprising:
   a database storing:
      (a) a plurality of characters, and
      (b) a plurality of character information, wherein each of the plurality of character information is associated with one of the plurality of characters;
   wherein each of the plurality of character information associated with a character stored in the database includes:
      (a) a first type of information regarding the associated character,
      (b) a second type of information regarding said associated character, wherein said first type of information is different from said second type of information, and
      (c) information disclosure settings information that sets which of the plurality of characters stored in the character server the first type of information is disclosable to and which of the plurality of characters stored in the character server the second type of information is disclosable to,
   wherein information communication control is executed between communication terminal devices using the characters registered in the character server; and
   wherein each of the characters are downloadable and uploadable for use in multiple types of game programs and wherein the characters act on behalf of users in the game programs.

16. The character server of claim 15, wherein the information disclosure settings information includes character usage destination information;
   wherein the character usage destination information includes an address of a communication terminal device using a character;
   and wherein the character server executes processing for disclosing the address to another character, with character information being registered in one of the character server and another character managing user.

17. The character server of claim 15, wherein the information disclosure settings information includes character usage destination information;
   wherein the character usage destination information includes an address of a network game server using a character;
   and wherein the character server executes processing for disclosing the address to another character, with character information being registered in one of the character server and another character managing user.

18. The character server of claim 15, wherein the information disclosure settings information includes disclosure range information;

wherein the disclosure range information includes data correlating disclosure range information within character information and disclosure destination character information;

and wherein the character server executes processing for disclosing the character information to another character, with character information being registered in one of the character server and another character managing user, following setting conditions of the disclosure range information.

19. The character server of claim 15, wherein the information disclosure settings information includes a buddy character list;

wherein the buddy character list includes other character information data to which character information is disclosable;

and wherein the character server executes processing for disclosing the character information to another character, with character information being registered in one of the character server and another character managing user, following character conditions registered in the buddy character list.

20. The character server of claim 15, wherein the information disclosure settings information includes message termination settings information;

wherein the message termination settings information includes settings data regarding the permissibility of respective reception and termination of messages from another character wherein character information is registered in one of the character server and another character managing user;

and wherein the character server executes processing for transmission of a message from another character wherein character information is registered in one of the character server and another character managing user, following the message termination settings information.

21. The character server of claim 15, wherein the character server executes authentication processing to a respective communication terminal device, and executes data transmission to the communication terminal device when authentication is established.

22. The character server of claim 15, wherein the character server obtains character usage destination information from character usage destination information within character information corresponding to a buddy character based on buddy character identification data registered in the character information, in response to reception of a character state transmission request from a respective communication terminal device, and executes processing for transmitting a character status, obtained by inquiry to the obtained character usage destination information, to the communication terminal device which made the character state transmission request.

23. The character server of claim 15, wherein the character server obtains character usage destination information from character usage destination information within character information corresponding to a buddy character based on buddy character identification data registered in the character information, in response to reception of a character state transmission request from a respective communication terminal device, and executes processing for transmitting a character status obtained by inquiry to the obtained character usage destination information, and an address of a game server providing a game program in which the buddy character is participating, to the communication terminal device which made the character state transmission request.

24. The character server of claim 23, wherein the transmitting character status processing includes an interface having information on a game program in which at least one user is participating.

25. The character server of claim 15, wherein a user features a character in a game provided by a network game server.

26. The character server of claim 15, wherein each of the communication terminal devices converts a form, a texture, and a material associated with a downloaded character into a matching form, a matching texture, and a matching material associated with other characters in the game program.

27. The character data managing method for managing character data displayed on a communication terminal device, the method comprising:

storing, in a character server:
(a) a plurality of characters, and
(b) a plurality of character information, wherein each of the plurality of character information is associated with one of the plurality of characters;

wherein each of said plurality of character information associated with a character stored in the character server contains:
(a) a first type of information regarding the associated character;
(b) a second type of information regarding said associated character, wherein said first type of information is different from said second type of information; and
(c) information disclosure settings information that sets which of the plurality of characters stored in the character server the first type of information is disclosable to and which of the plurality of characters stored in the character server the second type of information is disclosable to, transmitting, to a communication terminal device using a first character in one of the game programs, at least one of (i) a first type of information associated with a second character and (ii) a second type of information associated with the second character according to an information disclosure settings information associated with the second character.

28. The character data managing method of claim 27, further comprising enabling, at the communication terminal device, transferring of a character registered in the character server to the communication terminal device and executing a game provided by a game server featuring the downloaded character.

29. The character data managing method of claim 27, wherein the information disclosure settings information within character information stored in the character server includes character usage destination information;

wherein the character usage destination information includes an address of a communication terminal device currently using a character;

and wherein the character server executes processing for disclosing the address to another character, with character information being registered in one of the character server and another character managing user.

30. The character data managing method of claim 27, wherein the information disclosure settings information within character information stored in the character server includes character usage destination information;

wherein the character usage destination information includes an address of a network game server currently using a character;

and wherein the character server executes processing for disclosing the address to another character, with character information being registered in one of the character server and another character managing user.

31. The character data managing method of claim 27, wherein the information disclosure settings information within character information stored in the character server includes disclosure range information;
   wherein the disclosure range information includes data correlating disclosure range information within character information and disclosure destination character information;
   and wherein the character server executes processing for disclosing the character information to another character, with character information being registered in one of the character server and another character managing user, following setting conditions of the disclosure range information.

32. The character data managing method of claim 27, wherein the information disclosure settings information within character information stored in the character server includes a buddy character list;
   wherein the buddy character list includes other character information data to which character information is disclosable;
   and wherein the character server executes processing for disclosing the character information to another character, with character information being registered in one of the character server and another character managing user, following character conditions registered in the buddy character list.

33. The character data managing method of claim 27, wherein the information disclosure settings information within character information stored in the character server includes message termination settings information;
   wherein the message termination settings information includes settings data regarding the permissibility of respective reception and termination of messages from another character wherein character information is registered in one of the character server and another character managing user;
   and wherein the character server executes processing for transmission of a message from another character wherein character information is registered in one of the character server and another character managing user, following the message termination settings information.

34. The character data managing method of claim 27, wherein the character server executes authentication processing to a respective communication terminal device, and executes data transmission to the communication terminal device when authentication is established.

35. The character data managing method of claim 27, wherein the character server obtains character usage destination information from character usage destination information within character information corresponding to a buddy character based on buddy character identification data registered in the character information, in response to reception of a character state transmission request from a respective communication terminal device, and executes processing for transmitting a character status obtained by inquiry to the obtained character usage destination information, to the communication terminal device which made the character state transmission request.

36. The character data managing method of claim 27, wherein the character server obtains character usage destination information from character usage destination information within character information corresponding to a buddy character based on buddy character identification data registered in the character information, in response to reception of a character state transmission request from a respective communication terminal device, and executes processing for transmitting a character status obtained by inquiry to the obtained character usage destination information, and address information of a game server providing a game program in which the buddy character is participating, to the communication terminal device which made the character state transmission request.

37. The character data managing method of claim 36, wherein the communication terminal device executes access to the game server following address information of the game server providing the game program in which the buddy character obtained from the character server is participating, and executes game participation processing of own character obtained by downloading from the character server.

38. The character data managing method of claim 36, wherein the game participation processing includes an interface having at least one game participation button in an area corresponding to at least one user participating in the game.

39. The character data managing method of claim 27, wherein a user features a character in a game provided by a network game server.

40. The character data managing method of claim 27, further comprising converting a form, a texture, and a material associated with a downloaded character into a matching form, a matching texture, and a matching material associated with other characters in the game program.

41. A non-transitory storing medium, storing a program for executing, on a computer system, character data management processing that manages player-controlled character data displayed on a communication terminal device, the program comprising:
   a step for executing information communication control between communication terminal devices using:
      (a) a first character registered and stored in a character server; and
      (b) a second character registered and stored in said character server, said character server including:
         (a) a first type of information regarding the second character;
         (b) a second type of information regarding said second character, wherein said first type of information is different from said second type of information; and
         (c) information disclosure settings information that sets which characters stored in the character server the first type of information is disclosable to and which characters stored in the character server the second type of information is disclosable to,
   a step for following said information disclosure settings information, wherein the information disclosure settings information is used to determine whether at least one of (i) the first type of information regarding the second character and (ii) the second type of information regarding the second character is disclosable to the communication terminal device using the first character,
   wherein each of the first character and second character are downloadable and uploadable for use in multiple types of game programs and wherein each of the first character and second character act on behalf of a user in the game programs.

42. The storing medium of claim 41, further enabling, at communication terminal device, transferring of a character registered in the character server to the communication terminal device and executing a game provided by a game server featuring the downloaded character.

43. The storing medium of claim 41, wherein the information disclosure settings information within character information stored in the character server includes character usage destination information;
- wherein the character usage destination information includes an address of a communication terminal device currently using a character;
- and wherein the character server executes processing for disclosing the address to another character, with character information being registered in one of the character server and another character managing user.

44. The storing medium of claim 41, wherein the information disclosure settings information within character information stored in the character server includes character usage destination information;
- wherein the character usage destination information includes an address of a network game server currently using a character;
- and wherein the character server executes processing for disclosing the address to another character, with character information being registered in one of the character server and another character managing user.

45. The storing medium of claim 41, wherein the information disclosure settings information within character information stored in the character server includes disclosure range information;
- wherein the disclosure range information includes data correlating disclosure range information within character information and disclosure destination character information;
- and wherein the character server executes processing for disclosing the character information to another character, with character information being registered in one of the character server and another character managing user, following setting conditions of the disclosure range information.

46. The storing medium of claim 41, wherein the information disclosure settings information within character information stored in the character server includes a buddy character list;
- wherein the buddy character list includes other character information data to which character information is disclosable;
- and wherein the character server executes processing for disclosing the character information to another character, with character information being registered in one of the character server and another character managing user, following character conditions registered in the buddy character list.

47. The storing medium of claim 41, wherein the information disclosure settings information within character information stored in the character server includes message termination settings information;
- wherein the message termination settings information includes settings data regarding the permissibility of respective reception and termination of messages from another character, with character information being registered in one of the character server and another character managing user;
- and wherein the character server executes processing for transmission of a message from another character, with character information being registered in the character server and another character managing user, following the message termination settings information.

48. The storing medium of claim 41, wherein the program effects the character server executing authentication processing to a respective communication terminal device and executing data transmission to the communication terminal device when authentication is established.

49. The storing medium of claim 41, wherein the program effects the character server obtaining character usage destination information from character usage destination information within character information corresponding to a buddy character based on buddy character identification data registered in the character information, in response to reception of a character state transmission request from a respective communication terminal device, and executing processing for transmitting a character status obtained by inquiry to the obtained character usage destination information, to the communication terminal device which made the character state transmission request.

50. The storing medium of claim 41, wherein the program effects the character server obtaining character usage destination information from character usage destination information within character information corresponding to a buddy character based on buddy character identification data registered in the character information, in response to reception of a character state transmission request from a respective communication terminal device, and executing processing for transmitting a character status obtained by inquiry to the obtained character usage destination information, and address information of a game server providing a game program in which the buddy character is participating, to the communication terminal device which made the character state transmission request.

51. The storing medium of claim 50, wherein the program effects the communication terminal device executing access to the game server following address information of the game server providing the game program in which the buddy character obtained from the character server is participating, and executing game participation processing of own character obtained by downloading from the character server.

52. The storing medium of claim 50, wherein the game participation processing includes an interface having at least one game participation button in an area corresponding to at least one user participating in the game.

53. The storing medium of claim 41, wherein a user features a character in a game provided by a network game server.

54. The storing medium of claim 41, further comprising a step of converting a form, a texture, and a material associated with a downloaded character into a matching form, a matching texture, and a matching material associated with other characters in the game program.

* * * * *